(12) United States Patent
Sun et al.

(10) Patent No.: US 11,196,474 B2
(45) Date of Patent: Dec. 7, 2021

(54) METHODS FOR MULTI-ANTENNA TRANSMISSION IN VEHICULAR COMMUNICATIONS

(71) Applicant: Telefonaktiebolaget LM Ericsson (publ), Stockholm (SE)

(72) Inventors: Wanlu Sun, Solna (SE); Ricardo Blasco Serrano, Espoo (FI); Hieu Do, Järfälla (SE); Stefano Sorrentino, Solna (SE)

(73) Assignee: Telefonaktiebolaget LM Ericsson (Publ)

( * ) Notice: Subject to any disclaimer, the term of this patent is extended or adjusted under 35 U.S.C. 154(b) by 120 days.

(21) Appl. No.: 16/492,513

(22) PCT Filed: Mar. 21, 2018

(86) PCT No.: PCT/SE2018/050292
§ 371 (c)(1),
(2) Date: Sep. 9, 2019

(87) PCT Pub. No.: WO2018/174798
PCT Pub. Date: Sep. 27, 2018

(65) Prior Publication Data
US 2021/0135732 A1    May 6, 2021

Related U.S. Application Data

(60) Provisional application No. 62/476,235, filed on Mar. 24, 2017.

(51) Int. Cl.
*H04W 24/10* (2009.01)
*H04B 7/06* (2006.01)
*H04L 5/00* (2006.01)
*H04L 25/02* (2006.01)

(52) U.S. Cl.
CPC ......... *H04B 7/0689* (2013.01); *H04L 5/0048* (2013.01); *H04L 25/0204* (2013.01); *H04W 24/10* (2013.01)

(58) Field of Classification Search
CPC ..... H04W 84/12; H04W 28/06; H04W 52/02; H04W 52/0229; H04W 72/0446;
(Continued)

(56) References Cited

U.S. PATENT DOCUMENTS

| 2002/0102950 A1* | 8/2002 | Gore | H04B 7/0874 455/101 |
| 2003/0125040 A1* | 7/2003 | Walton | H04B 7/0891 455/454 |

(Continued)

OTHER PUBLICATIONS

International Search Report and Written Opinion dated Jun. 18, 2018 for International Application No. PCT/SE2018/050292 filed on Mar. 21, 2018; consisting of 21-pages.
Ciochina, C. et al. "Space-frequency block code for single-carrier FDMA"; Electronic Letters; May 22, 2008; vol. 44 No. 11, consisting of 2-pages.

*Primary Examiner* — Eva Y Puente
(74) *Attorney, Agent, or Firm* — Christopher & Weisberg, P.A.

(57) ABSTRACT

A wireless device configured for transmission using a transmission scheme other than a multi-antenna transmission scheme is provided. The wireless device includes at least one receiver configured to receive a transmission of a multi-antenna transmission scheme, and processing circuitry configured to perform at least one of a channel estimation function and measurement function using the received transmission of the multi-antenna transmission scheme, the multi-antenna transmission scheme remaining transparent to the wireless device.

20 Claims, 16 Drawing Sheets

(58) Field of Classification Search
CPC . H04W 16/28; H04W 24/08; H04W 52/0235; H04W 88/08; H04W 88/085; H04W 4/02; H04W 4/70; H04B 3/52; H04B 3/56; H04B 3/54; H04B 3/58; H04B 2203/5441; H04B 2203/5483; H04B 2203/5479; H04B 2203/5445; H04B 3/46; H04B 3/542; H04B 7/0413; H01P 3/10; H01P 3/16; H01P 1/16; H01P 5/188; H01P 3/127; H01P 5/08; H01P 5/087; H01P 1/22; H01P 3/06; H01P 3/122; H01P 1/10; H01P 1/182; H01P 1/207
USPC ......... 375/260, 295, 267, 137; 455/101, 454
See application file for complete search history.

(56) References Cited

U.S. PATENT DOCUMENTS

| | | | |
|---|---|---|---|
| 2005/0286484 A1 | 12/2005 | Nakao et al. | |
| 2006/0002361 A1 | 1/2006 | Webster et al. | |
| 2007/0274409 A1* | 11/2007 | Park | H04L 1/0001 375/267 |
| 2009/0080550 A1* | 3/2009 | Kushioka | H04J 11/00 375/260 |
| 2010/0008400 A1* | 1/2010 | Chari | H04L 1/06 375/137 |
| 2012/0328045 A1* | 12/2012 | Naguib | H04B 7/0417 375/295 |
| 2014/0314168 A1* | 10/2014 | Xu | H04B 7/0456 375/267 |

* cited by examiner

METHODS FOR MULTI-ANTENNA TRANSMISSION IN VEHICULAR COMMUNICATIONS

CROSS-REFERENCE TO RELATED APPLICATIONS

This application is a Submission Under 35 U.S.C. § 371 for U.S. National Stage Patent Application of International Application No.: PCT/SE2018/050292, filed Mar. 21, 2018 entitled "METHODS FOR MULTI-ANTENNA TRANSMISSION IN VEHICULAR COMMUNICATIONS," which claims priority to U.S. Provisional Application No. 62/476,235, filed Mar. 24, 2017, entitled "METHODS FOR MULTI-ANTENNA TRANSMISSION IN VEHICULAR COMMUNICATIONS," the entireties of both of which are incorporated herein by reference.

FIELD

The disclosure relates to wireless communication systems, and in particular to multi-antenna transmission with the participation of vehicles and mobile users.

BACKGROUND

D2D and V2X in 3GPP

As part of Third Generation Partnership Project Technical Specification (3GPP TS) Release 12 (referred to as Rel-12), the Long Term Evolution (LTE) standard has been extended to support device to device (D2D) (also known as "sidelink") features targeting both commercial and Public Safety applications. Some applications enabled by Rel-12 LTE are device discovery, where devices are able to sense the proximity of another device and associated application by broadcasting and detecting discovery messages that carry device and application identities. Another application consists of direct communication based on physical channels terminated directly between devices.

In 3GPP TS Release 14 (Rel-14), the extensions for the D2D work include support of vehicle-to-anything-you-can-imagine (V2X) communication, which includes any combination of direct communication between vehicles, pedestrians and infrastructure. FIG. 1 is a block diagram of V2X scenarios for an LTE-based network (NW). V2X communication may take advantage of a NW infrastructure, when available, but at least basic V2X connectivity should be possible even in case of lack of coverage. Providing an LTE-based V2X interface may be economically advantageous because of the LTE economies of scale and it may enable tighter integration between communications with the NW infrastructure (V2I) and V2P and V2V communications, as compared to using a dedicated V2X technology.

V2X communications may carry both non-safety and safety information, where each of the applications and services may be associated with specific requirements sets, e.g., in terms of latency, reliability, capacity, etc.

The European Telecommunications Standards Institute (ETSI) has defined two types of messages for road safety: Co-operative Awareness Message (CAM) and Decentralized Environmental Notification Message (DENM). CAM: The CAM message is intended to enable vehicles, including emergency vehicles, to notify their presence and other relevant parameters in a broadcast fashion. Such messages target other vehicles, pedestrians, and infrastructure, and are handled by their applications. CAM message also serves as active assistance to safety driving for normal traffic. The availability of a CAM message is indicatively checked for every 100 ms, yielding a maximum detection latency requirement of <=100 ms for most messages. However, the latency requirement for Pre-crash sensing warning is 50 ms. DENM: The DENM message is event-triggered, such as by braking, and the availability of a DENM message is also checked for every 100 ms, and the requirement of maximum latency is <=100 ms. The package size of CAM and DENM message varies from 100+ to 800+ bytes and the typical size is around 300 bytes. The message is supposed to be detected by all vehicles in proximity. Of note the term "pedestrians" as used herein also refers to the wireless devices worn or carried by the pedestrians.

LTE V2X in Rel-14 and in 3GPP TS Release 15 (Rel-15)

The technical solution for V2X in Rel-14 was optimized to fulfill latency and reliability requirements of disseminating broadcast safety messages, typically the CAM and DENM above, taking into account challenges of V2X environment such as high Doppler impact at high speed. The core essence of the solution for V2X in Rel-14 is as follows:

The physical channels use the DFTS-OFDM waveform for data and control information. Each subframe for control information (scheduling assignment, SA) or data includes four reference signal symbols (DMRS), time-multiplexed with DFTS-OFDM symbols carrying the payload, as illustrated in FIG. 2. FIG. 2 is a block diagram of a subframe structure for control information and data in LTE V2X sidelink.

SA and its associated data are transmitted in the same TTI as illustrated in FIG. 3. FIG. 3 is a block diagram of an example of SA pool consisting of three SA subchannels and data pool consisting of three data subchannels, where SA and data pools are multiplexed in frequency, Left side of FIG. 3: SA pool and data pool use orthogonal resources; Right side of FIG. 3: SA pool and data pool overlap. The SA occupies two consecutive resource blocks in frequency domain, while the bandwidth for data can vary depending on the packet size.

Each wireless device performs sensing to select resources for transmission. The sensing mechanism in each wireless device relies on a combination of decoding SA of other wireless devices and measuring received signal power in resource blocks. The latter consists of two parts:

Coherent measurements of the power of the (received) RS symbols, known as PSSCH-RSRP measurement.

Incoherent energy measurements of the power of all the symbols (i.e., carrying DMRS and payload).

Each wireless device is assumed to have one transmit antenna and two receive antennas, i.e. no transmit diversity.

For Rel-15, 3GPP is aiming at enhancements of the solution in Rel-14 LTE V2X to fulfill more stringent requirements on latency and reliability in disseminating V2X messages.

LTE Diversity Schemes

In LTE, Tx diversity has been supported since 3GPP TS Release 8 (Rel-8) for the Physical Downlink Shared Channel (PDSCH) in Transmission Modes 2 & 3 (TM2 & TM3), as well as for transmission of the broadcast and control channels. TM2 uses single layer Tx Diversity scheme based on Space-Frequency Block Code (SFBC), an instance of the well-known Alamouti scheme. If 2 CRS ports are employed at the network node, e.g., eNodeB, SFBC includes mapping pairs of modulation symbols to adjacent subcarriers on both antenna ports. If 4 CRS ports are employed at the network node, SFBC is combined with Frequency-Switched Transmit Diversity (FSTD). In this case, on each pair of subcarriers, SFBC according to the 2 TX scheme is performed on a pair of antenna ports.

SUMMARY

Some embodiments advantageously provide a method, wireless device and network node for multi-antenna transmission with the participation of various wireless devices such as vehicles and mobile users.

According to one aspect of the disclosure, a wireless device configured for transmission using a transmission scheme other than a multi-antenna transmission scheme. The wireless device includes at least one receiver configured to receive a transmission of a multi-antenna transmission scheme, and processing circuitry configured to perform at least one of a channel estimation function and measurement function using the received transmission of the multi-antenna transmission scheme, the multi-antenna transmission scheme remaining transparent to the wireless device.

According to one embodiment of this aspect, the transmission of the multi-antenna transmission scheme includes a symbol, the symbol having cyclic delay diversity. According to one embodiment of this aspect, the transmission of the multi-antenna transmission scheme includes a symbol, the multi-antenna transmission scheme corresponds to a precoder cycling applied to the symbol. According to one embodiment of this aspect, the transmission of the multi-antenna transmission scheme includes a symbol, the symbol includes two sequences as part of the multi-antenna transmission scheme. According to one embodiment of this aspect, the two sequences correspond to respective parts of an extended Zadoff-Chu sequence. According to one embodiment of this aspect, the two sequences include a first sequence and a second sequence, the first sequence having a length of M, the second sequence having a length of M/2.

According to one embodiment of this aspect, the two sequences include a first sequence and a second sequence, the second sequence being a cyclic time-shifted version of the first sequence, the first sequence being orthogonal to the second sequence. According to one embodiment of this aspect, the received transmission of the multi-antenna transmission scheme includes a scheduling assignment and data. The scheduling assignment has a first cyclic delay. The data has a second cyclic delay different from the first cyclic delay. According to one embodiment of this aspect, the received transmission of the multi-antenna transmission scheme includes a scheduling assignment and data. The scheduling assignment has a first precoder cycling. The data has a second precoder cycling different from the first precoder cycling.

According to one embodiment of this aspect, the received transmission of the multi-antenna transmission scheme includes a scheduling assignment and data. The scheduling assignment has a first cyclic delay diversity. The data has a second cyclic delay diversity different from the first cyclic delay diversity. According to one embodiment of this aspect, the multi-antenna transmission scheme is a multi-antenna transmission scheme for a payload symbol. According to one embodiment of this aspect, the multi-antenna transmission scheme is a multi-antenna transmission scheme for a reference signal symbol.

According to one embodiment of this aspect, the measurement function includes measuring a Physical Sidelink Shared Channel-Reference Signal Received Power, PSSCH-RSRP, based on the received transmission of the multi-antenna transmission scheme. According to one embodiment of this aspect, the channel estimation function includes estimating an effective channel.

According to another aspect of the disclosure, a method of a wireless device configured for transmission using a transmission scheme other than a multi-antenna transmission schemes is provided. A transmission of a multi-antenna transmission scheme is received. At least one of a channel estimation function and measurement function is performed using the received transmission of the multi-antenna transmission scheme. The multi-antenna transmission scheme remains transparent to the wireless device.

According to one embodiment of this aspect, the transmission of the multi-antenna transmission scheme includes a symbol, the symbol having cyclic delay diversity. According to one embodiment of this aspect, the transmission of the multi-antenna transmission scheme includes a symbol. The multi-antenna transmission scheme corresponds to a precoder cycling applied to the symbol. According to one embodiment of this aspect, the transmission of the multi-antenna transmission scheme includes a symbol. The symbol includes two sequences as part of the multi-antenna transmission scheme. According to one embodiment of this aspect, the two sequences correspond to respective parts of an extended Zadoff-Chu sequence.

According to one embodiment of this aspect, the two sequences include a first sequence and a second sequence. The first sequence having a length of M, the second sequence having a length of M/2.

According to one embodiment of this aspect, the two sequences include a first sequence and a second sequence. The second sequence is a cyclic time-shifted version of the first sequence, the first sequence being orthogonal to the second sequence. According to one embodiment of this aspect, the received transmission of the multi-antenna transmission scheme includes a scheduling assignment and data. The scheduling assignment has a first cyclic delay. The data has a second cyclic delay different from the first cyclic delay. According to one embodiment of this aspect, the received transmission of the multi-antenna transmission scheme includes a scheduling assignment and data. The scheduling assignment has a first precoder cycling. The data has a second precoder cycling different from the first precoder cycling.

According to one embodiment of this aspect, the received transmission of the multi-antenna transmission scheme includes a scheduling assignment and data. The scheduling assignment has a first cyclic delay diversity. The data has a second cyclic delay diversity different from the first cyclic delay diversity. According to one embodiment of this aspect, the multi-antenna transmission scheme is a multi-antenna transmission scheme for a payload symbol. According to one embodiment of this aspect, the multi-antenna transmission scheme is a multi-antenna transmission scheme for a reference signal symbol.

According to one embodiment of this aspect, the measurement function includes measuring a Physical Sidelink Shared Channel-Reference Signal Received Power, PSSCH-RSRP, based on the received transmission of the multi-antenna transmission scheme. According to one embodiment of this aspect, the channel estimation function includes estimating an effective channel.

According to another aspect of the disclosure, a wireless device configured for transmission using a transmission scheme other than a multi-antenna transmission scheme is provided. The wireless device includes receiver module configured to receive a transmission of a multi-antenna transmission scheme, and includes a scheme module configured to perform at least one of a channel estimation function and measurement function using the received transmission of the multi-antenna transmission scheme. The multi-antenna transmission scheme remains transparent to the wireless device.

According to another aspect of the disclosure, a network node is provided. The network node includes processing circuitry configured to determine a transmission scheme for wireless device. The wireless device is configured for multi-antenna transmission scheme transmission. The network node includes transmitter circuitry configured to signal the multi-antenna transmission scheme transmission to the wireless device for transmission by the wireless device. The multi-antenna transmission scheme transmission is usable by another wireless device that is configured for transmission using a transmission scheme other than a multi-antenna transmission for performing at least one of a channel estimation function and measurement function.

According to another aspect of the disclosure, a method for a network node is provided. The method includes determining a transmission scheme for a wireless device, where the wireless device is configured for multi-antenna transmission scheme transmission. The method further includes signaling (S106) the multi-antenna transmission scheme transmission to the wireless device for transmission by the wireless device. The multi-antenna transmission scheme transmission is usable by another wireless device that is configured for transmission using a transmission scheme other than a multi-antenna transmission scheme for performing at least one of a channel estimation function and measurement function.

According to another aspect of the disclosure, a network node is provided. The network node includes configuration module configured to determine a transmission scheme for wireless device. The wireless device configured for multi-antenna transmission scheme transmission. The network node includes transmitter module configured to signal the multi-antenna transmission scheme transmission to the wireless device for transmission by the wireless device. The multi-antenna transmission scheme transmission is usable by another wireless device that is configured for transmission using a transmission scheme other than a multi-antenna transmission for performing at least one of a channel estimation function and measurement function.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
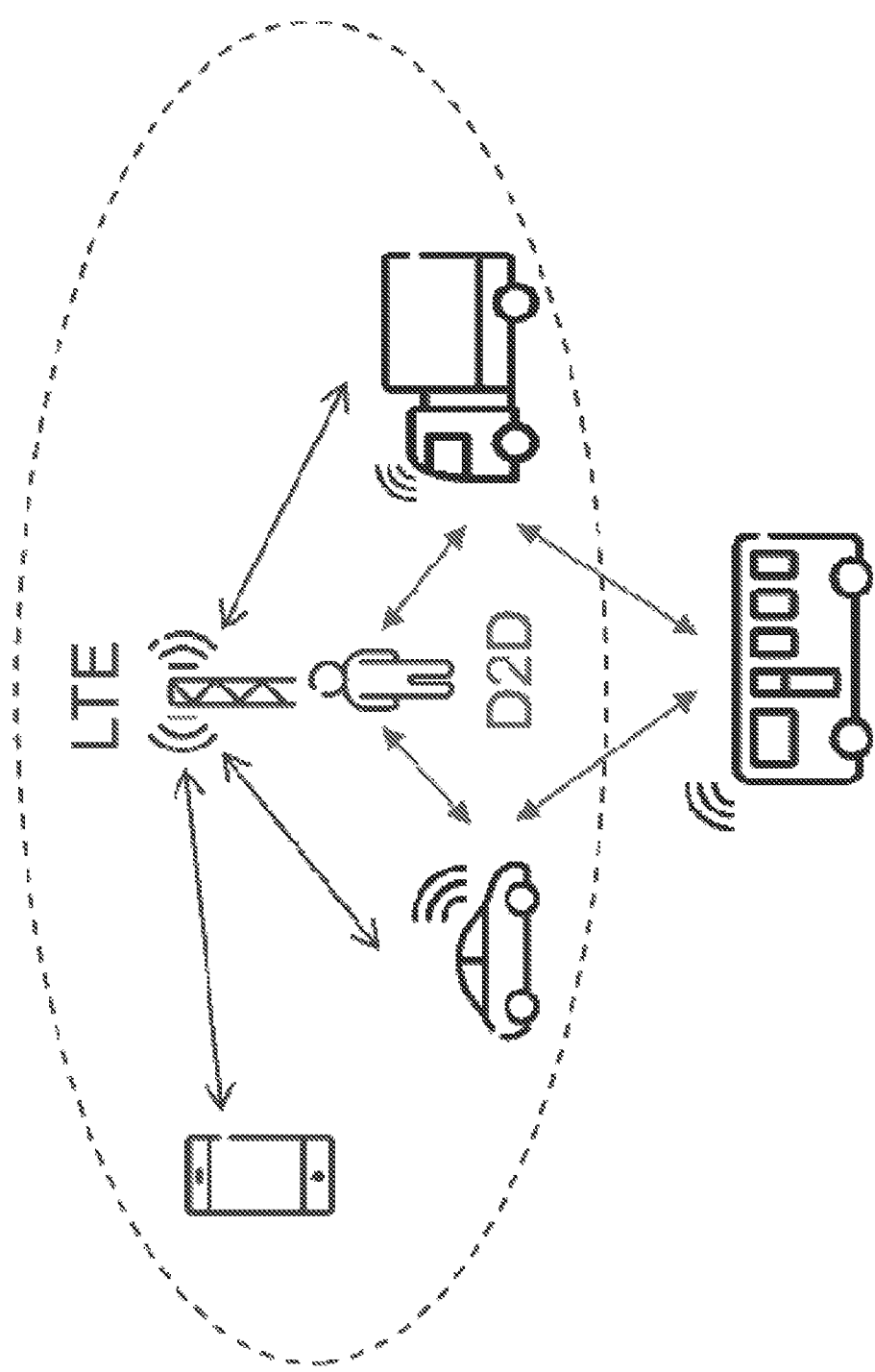
FIG. 1 is a block diagram of V2X scenarios for an LTE-based network (NW)

One characteristic of LTE technical solutions is the efficient coexistence of different versions of a feature. In case of LTE V2X, this implies that Rel-15+ solution should minimize any potential performance degradation to Rel-14 wireless devices if Rel-15+ wireless devices and Rel-14 wireless devices are to share the same resource pool. This at least requires that the sensing-based resource allocation protocol of Rel-14, described above, should not be severely affected by Rel-15 wireless device transmissions. This further implies that Rel-15 wireless devices need to:

use the same waveform at physical layer as Rel-14, i.e., SC-OFDM;

multiplex SA and data in the same way as in Rel-14;

use the same SA format so that Rel-14 wireless devices can read and decode it; and configure DMRS in such a way that Rel-14 wireless devices can measure PSSCH-RSRP properly.

On the other hand, to fulfill the more stringent requirements on reliability of communication, it is desirable that Rel-15 V2X wireless devices be equipped with multiple transmit antennas and employ certain transmit diversity schemes. However, the desired coexistence with Rel-14 may hinder a direct application the existing open-loop diversity schemes (which are more suitable for the broadcast nature of V2X safety messages) such as small-delay CDD, large-delay CDD, STBC/SFBC to Rel-15 wireless devices, as explained below:

Small-delay CDD. Diversity exploitation of SA transmission is not enough since the bandwidth of SA is small, e.g., only two RBs.

Large-delay CDD. In this case, if transparent Demodulation Reference Signal (DMRS) is used, the performance of channel estimation (CE) will be degraded due to the increased frequency selectivity. Here by transparent DMRS it is meant that the DMRS is precoded in the same way with the associated payload. On the other hand, if we use non-transparent DMRS, Physical Sidelink Shared Channel-Reference Signal Received Power (PSSCH-RSRP) measurement at Rel-14 wireless devices will not work correctly.

Space Time Block coding (STBC)/Space Frequency Block Coding (SFBC). In this case, even though the achieved diversity is more robust, neither SA decoding nor PSSCH-RSRP measurement can work correctly at Rel-14 wireless device receivers.

Therefore, there is no available technical solutions that allow Rel-15+ V2X wireless devices to take advantage of transmit diversity capabilities and at the same time to coexist efficiently with Rel-14 LTE V2X in the same resource pool.

The disclosure solves the problems with existing systems, such as those problems described above, by using different multi-antenna schemes within one Orthogonal Frequency-Division Multiplexing (OFDM) symbol for SA and data transmissions to the same receiver(s), i.e., to the same Rel-14 wireless device receivers and Rel-15+ wireless device receivers. In some cases, the schemes are also determined based on whether the symbol is an RS symbol or payload symbol.

The disclosure provides LTE V2X Rel-15 wireless devices to both exploit multi-antenna diversity gain and coexist efficiently with Rel-14 wireless devices. More specifically, Rel-14 wireless devices are able to decode the SA of Rel-15 wireless devices without any change;

Rel-14 wireless devices can measure the PSSCH-RSRP of Rel-15 transmissions without significant performance loss; and Data transmissions of Rel-15 wireless devices can utilize more robust diversity schemes, e.g., STBC or SFBC, to further improve reliability.

In the disclosure, unless otherwise specified, the terms SA, data, RS symbol, and payload are used as explained here. The following disclosure is described in the context of V2X communication. However, the teachings described herein are also applicable to other transmissions where one OFDM symbol includes different types of messages, e.g., control information and data information.

Before describing in detail exemplary embodiments, it is noted that the embodiments reside primarily in combinations of apparatus components and processing steps related to methods, wireless devices and nodes. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first," "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

Figure 4:
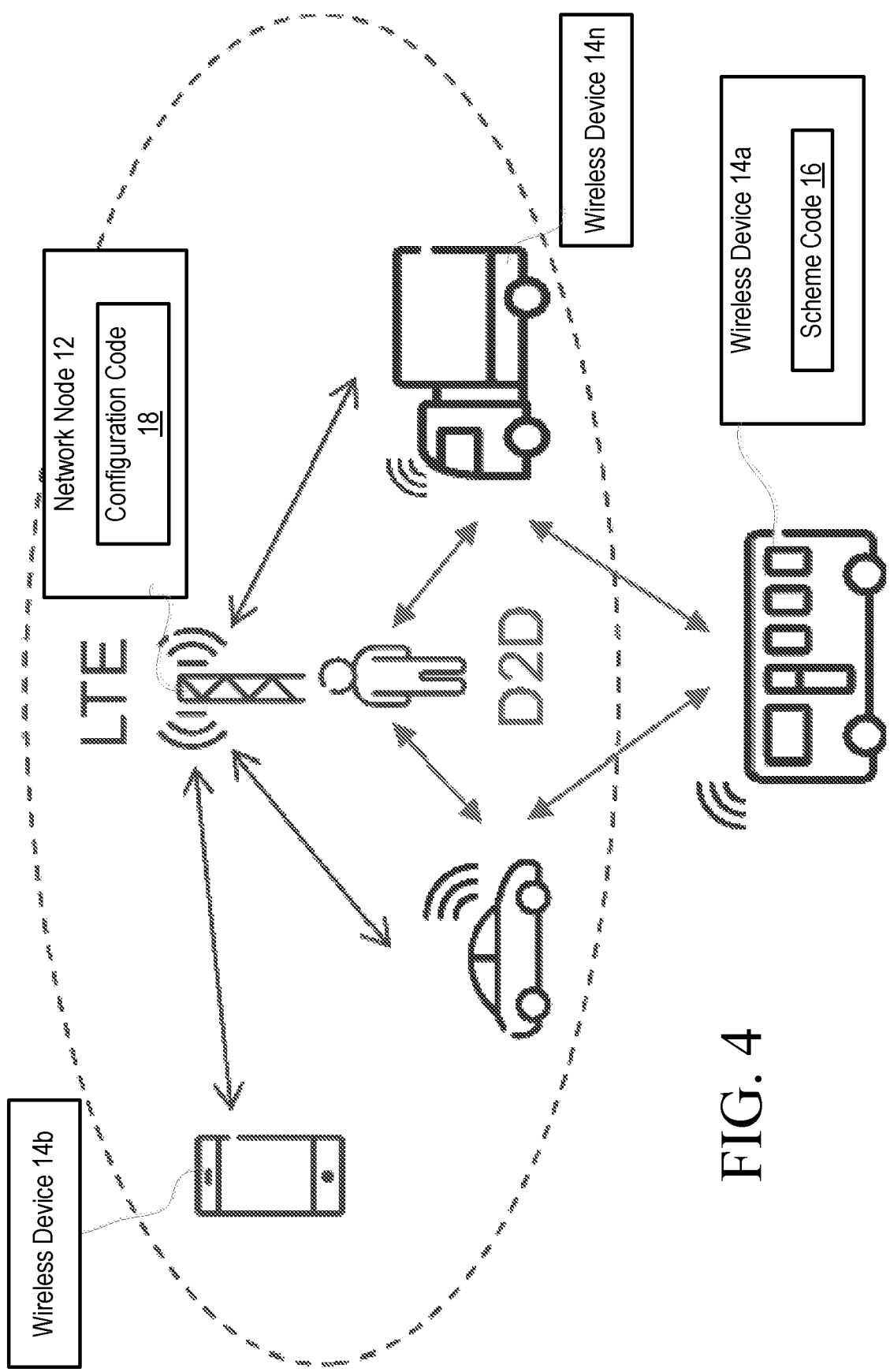
FIG. 4 is a block diagram of an exemplary system for multi-antenna transmission in V2X communications.

Referring now to drawing figures in which like reference designators refer to like elements there is shown in FIG. 4 is a block diagram of an exemplary system for multi-antenna transmission in V2X communications. System 10 includes one or more network nodes 12 and one or more wireless devices 14a-n (collectively referred to as wireless devices 14), in communication with each other via one or more communication networks, paths and/or links using one or more communication protocols as described herein.

As used herein, wireless device 14 may be any one of wireless devices 14a-14n. One or more wireless devices include scheme code 16 for performing the processes described herein such as with respect to FIG. 7. In one or more embodiments, wireless devices 14a-14n include devices having varied capability such as wireless devices 14 having Rel-14 capability and other wireless devices 14 having Rel-15+ capability, such that scheme code 16 is implemented in some wireless devices 15 such as in wireless devices 14 have Rel-14 capability. Network node 12 includes configuration code 18 for performing the processes described herein such as with respect to FIG. 8.

Figures 5, 6:
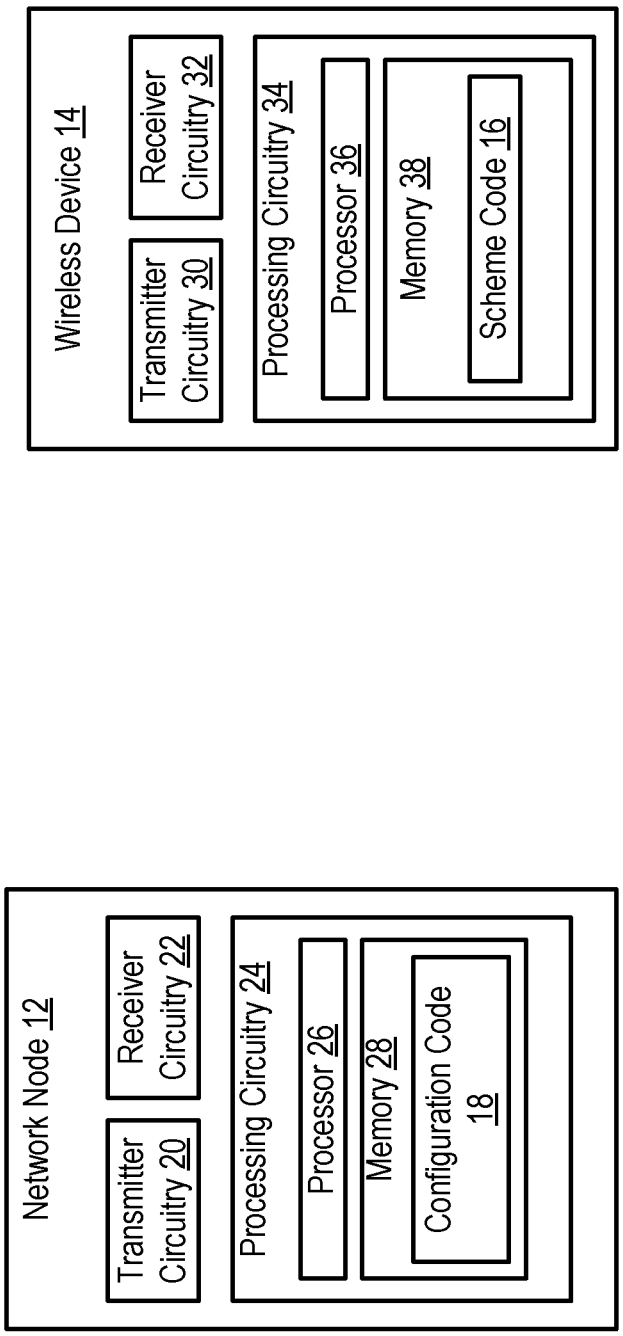
FIG. 5 is a block diagram of an exemplary network node in accordance with the principles of the disclosure.
FIG. 6 is a block diagram of an exemplary wireless device in accordance with the principles of the disclosure.

FIG. 5 is a block diagram of an exemplary network node 12 in accordance with the principles of the disclosure. Network node 12 includes transmitter circuitry 20 and receiver circuitry 22 for communicating with wireless device 14, other nodes 12 and/or other entities in system 10. In one or more embodiments, transceiver circuitry 20 and/or receiver circuitry 22 includes and/or is replaced by one or more communication interfaces. Network node 12 includes processing circuitry 24.

Processing circuitry 24 includes processor 26 and memory 28. In addition to a traditional processor and memory, processing circuitry 24 may comprise integrated circuitry for processing and/or control, e.g., one or more processors and/or processor cores and/or FPGAs (Field Programmable Gate Array) and/or ASICs (Application Specific Integrated Circuitry). Processor 26 may be configured to access (e.g., write to and/or reading from) memory 28, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory). Such memory 28 may be configured to store code executable by processor 26 and/or other data, e.g., data pertaining to communication, e.g., configuration and/or address data of nodes, etc.

Processing circuitry 24 may be configured to control any of the methods and/or processes described herein and/or to cause such methods, signaling and/or processes to be performed, e.g., by network node 12. Processor 26 corresponds to one or more processors 26 for performing network node 12 functions described herein. Network node 12 includes memory 28 that is configured to store data, programmatic software code and/or other information described herein. In one or more embodiments, memory 28 is configured to store configuration code 18. For example, configuration code 26 includes instructions that, when executed by processor 26, causes processor 26 to perform the functions described herein such as the functions described with respect to FIG. 8.

The network node 12 may be a base station, e.g., a Radio Base Station (RBS), and sometimes may be referred to herein as, e.g., evolved NodeB "eNB", "eNodeB", "NodeB", "B node", "gNode B", "gNB", or BTS (Base Transceiver Station), depending on the technology and terminology used. The network may be of different classes such as, e.g., macro eNodeB, home eNodeB or pico base station, based on transmission power and thereby also cell size. A cell is the geographical area where radio coverage is provided by the base station at a base station site. One base station, situated on the base station site, may serve one or several cells. Further, each base station may support one or several communication technologies. The network node 12 communicate over the air interface operating on radio frequencies with the wireless devices 14 within range of the network node 12.

FIG. 6 is a block diagram of an exemplary wireless device 14 in accordance with the principles of the disclosure. Wireless device 14 includes transmitter circuitry 30 and receiver circuitry 32 for communicating with wireless device 14, other nodes 12 and/or other entities in system 10. In one or more embodiments, transceiver circuitry 30 and/or receiver circuitry 32 includes and/or is replaced by one or more communication interfaces. Network node 12 includes processing circuitry 34.

Processing circuitry 34 includes processor 36 and memory 38. In addition to a traditional processor and memory, processing circuitry 34 may comprise integrated circuitry for processing and/or control, e.g., one or more processors and/or processor cores and/or FPGAs (Field Programmable Gate Array) and/or ASICs (Application Specific Integrated Circuitry). Processor 36 may be configured to access (e.g., write to and/or reading from) memory 38, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory). Such memory 38 may be configured to store code executable by processor 36 and/or other data, e.g., data pertaining to communication, e.g., configuration and/or address data of nodes, etc.

Processing circuitry 34 may be configured to control any of the methods and/or processes described herein and/or to cause such methods, signaling and/or processes to be performed, e.g., by wireless device 14. Processor 36 corresponds to one or more processors 36 for performing wireless device 14 functions described herein. Wireless device 14 includes memory 38 that is configured to store data, programmatic software code and/or other information described herein. In one or more embodiments, memory 38 is configured to store scheme code 16. For example, scheme code 16 includes instructions that, when executed by processor 36, causes processor 36 to perform the functions described herein such as the functions described with respect to FIG. 6.

Wireless device 12 may be a radio communication device, wireless device endpoint, mobile endpoint, device endpoint, sensor device, target device, device-to-device wireless device, user equipment (UE), machine type wireless device or wireless device capable of machine to machine communication, a sensor equipped with wireless device, tablet, mobile terminal, mobile telephone, laptop, computer, appliance, automobile, smart phone, laptop embedded equipped (LEE), laptop mounted equipment (LME), USB dongle and customer premises equipment (CPE), among other devices that can communicate radio or wireless signals as are known in the art.

Figure 7:
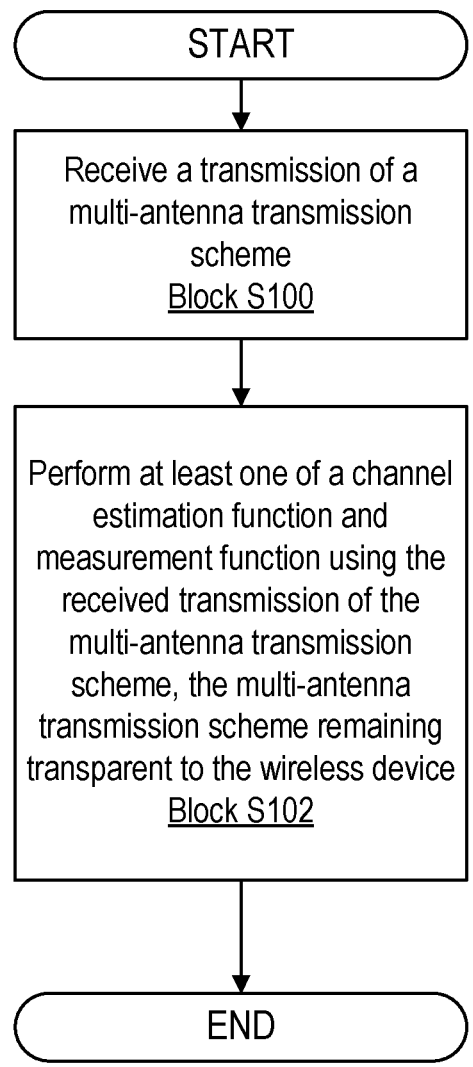
FIG. 7 is a flow diagram of an exemplary process of scheme code in accordance with the principles of the disclosure.

FIG. 7 is a flow diagram of an exemplary process of scheme code 16 in accordance with the principles of the disclosure. Processing circuitry 34 receives a transmission of a multi-antenna transmission scheme (Block S100). For example, receiver circuitry 32 is configured to receive a transmission of a multi-antenna transmission scheme. Processing circuitry 34 performs at least one of a channel estimation function and measurement function using the received transmission of the multi-antenna transmission scheme (Block S102). The multi-antenna transmission scheme remains transparent to the wireless device. Processing circuitry 34 may perform other functions based on the received transmission of the multi-antenna transmission scheme, as described herein.

Figure 8:
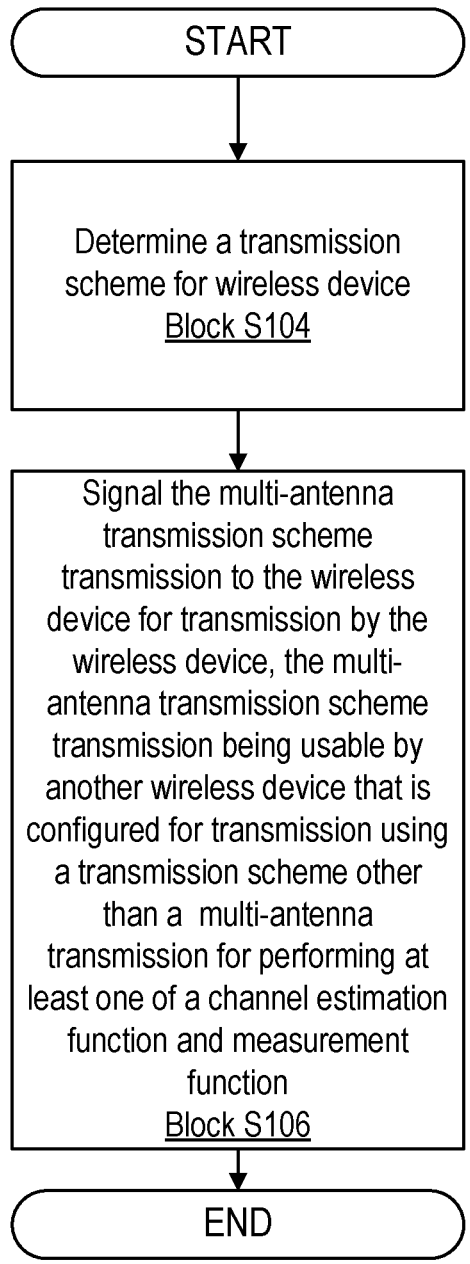
FIG. 8 is a flow diagram of an exemplary process of configuration code in accordance with the principles of the disclosure.

FIG. 8 is a flow diagram of an exemplary process of configuration code 18 in accordance with the principles of the disclosure. Processing circuitry 24 is configured to determine a transmission scheme for wireless device 14 (Block S104). Various examples of transmission schemes, such as multi-antenna transmission schemes, are described herein. Processing circuitry 24 is configured to signal the multi-antenna transmission scheme transmission to the wireless device for transmission by the wireless device where the multi-antenna transmission scheme transmission is usable by another wireless device that is configured for transmission using a transmission scheme other than a multi-antenna transmission for performing at least one of a channel estimation function and measurement function (Block S106).

Figure 9:
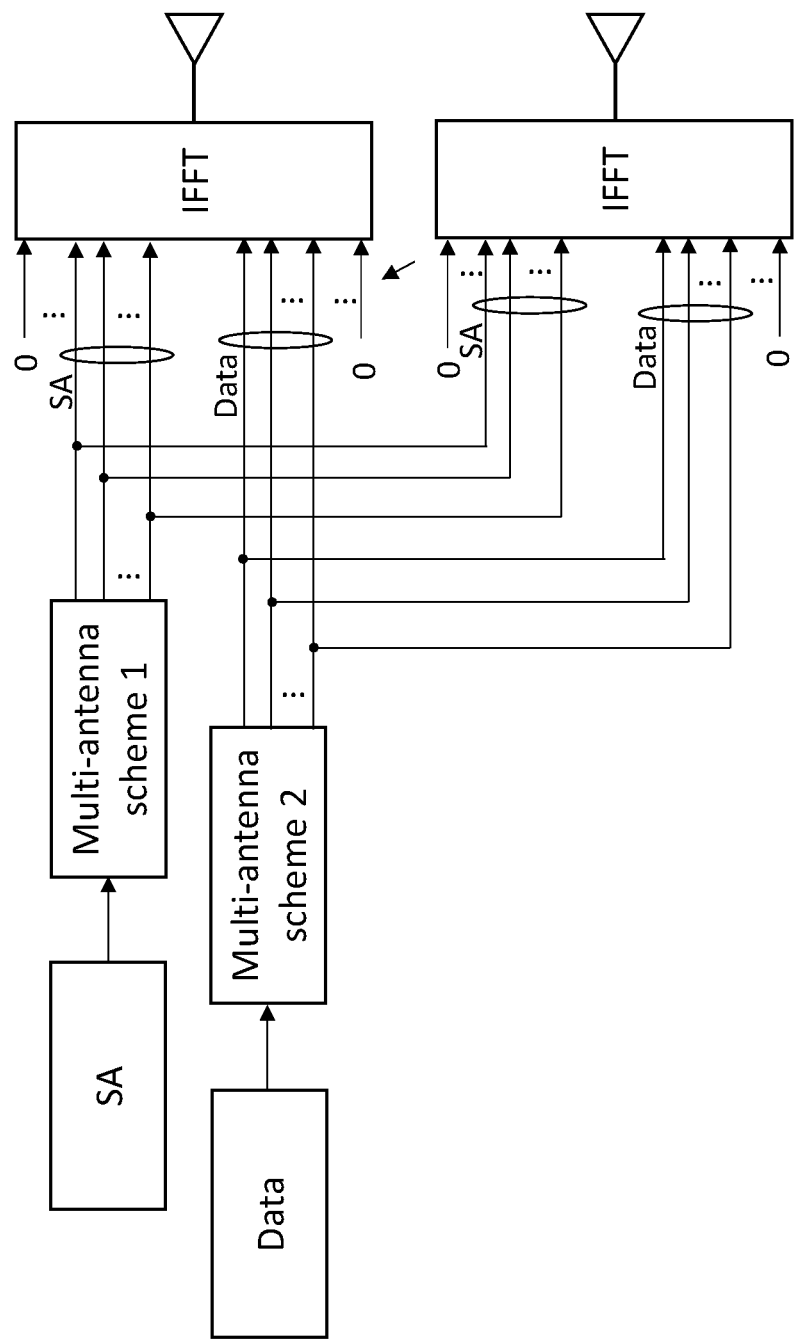
FIG. 9 is a block diagram of the application of different multi-antenna schemes to SA and data transmissions at the transmitter in accordance with the principles of the disclosure.

The disclosure includes using different multi-antenna schemes within one symbol for SA and data transmissions. An example with two Tx antennas is illustrated in FIG. 9. In particular, FIG. 9 is a block diagram of the application of different multi-antenna schemes to SA and data transmissions at the transmitter in accordance with the principles of the disclosure. The selection of schemes can depend on whether the symbol is an RS symbol or a payload symbol.

Embodiments of the multi-antenna schemes for RS symbols and for payload symbols are described below, followed by a discussion on combinations of embodiments. The embodiments will be presented in the context of two antenna ports but the disclosure is applicable to the general case of more than two ports.

Embodiments on Multi-Antenna Transmission Schemes for RS Symbols

Figure 2:
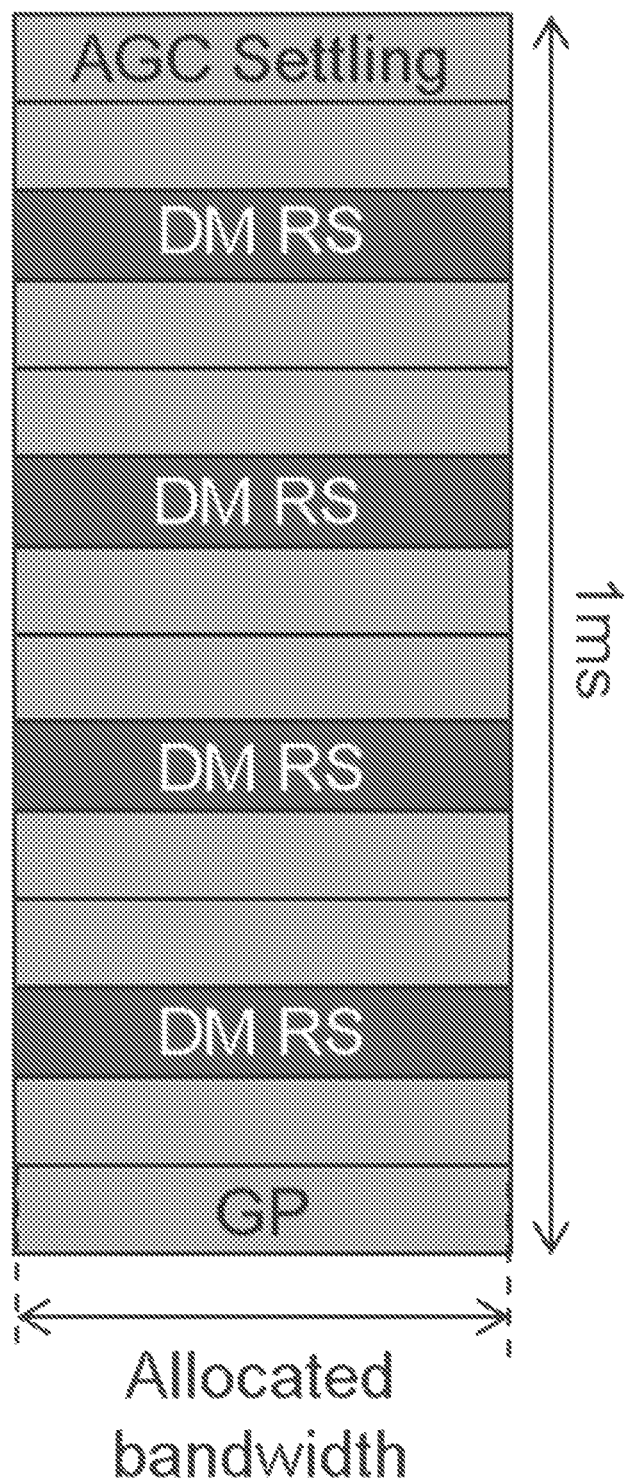
FIG. 2 is a block diagram of a subframe structure for control information and data in LTE V2X sidelink.
Figure 3:
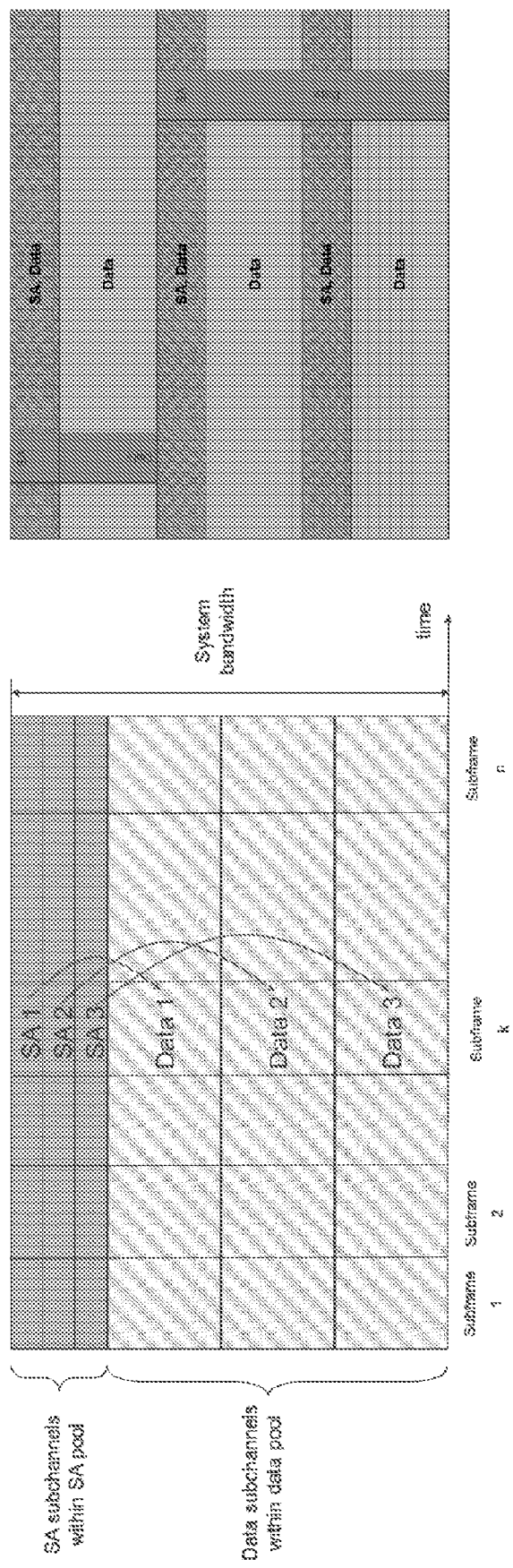
FIG. 3 is a block diagram of an example of SA pool consisting of three SA subchannels and data pool consisting of three data subchannels.

In these embodiments, consider multi-antenna transmission schemes for RS symbols, i.e., symbols #2, #5, #8, and #11 in a subframe (see FIG. 2).

Embodiment 1.1

Figure 10:
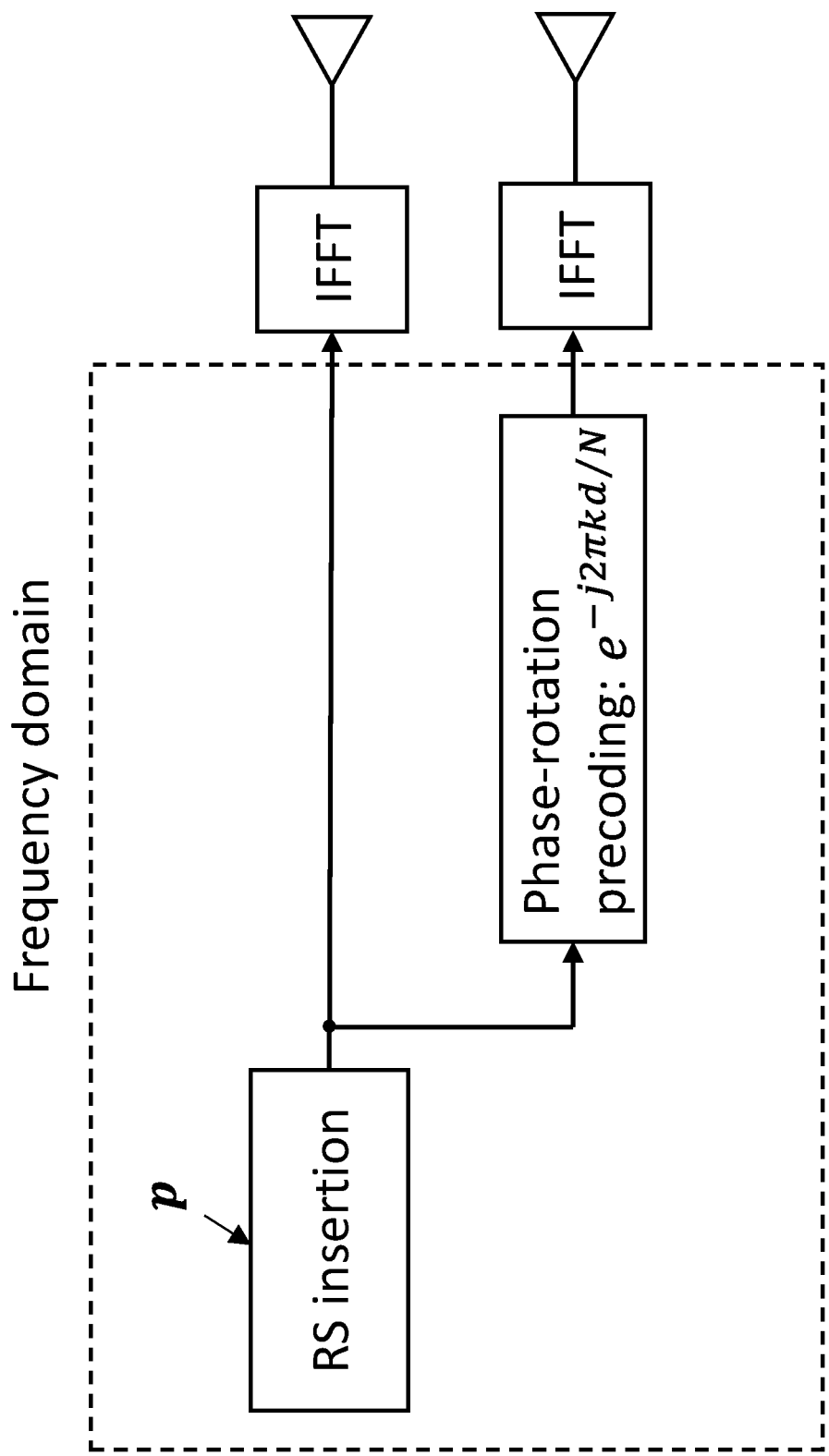
FIG. 10 is a block diagram of an exemplary implementation of CCD in the frequency domain in accordance with the principles of the disclosure.

In some embodiments described with respect to RS insertion, cyclic delay diversity (CDD) is applied with a cyclic delay d to the sequence p of reference signal (RS) and implement it in frequency domain as a phase-rotation precoding as shown in FIG. 10. In particular, FIG. 10 is a block diagram of an exemplary implementation of CCD in the frequency domain, such as by wireless device 14. The phase-rotation precoder is given as $e^{-j2\pi kd/N}$, where k is the subcarrier index, N is the Fast Fourier Transform (FFT) size, and d is the selected cyclic shift in time domain depending on e.g., RS bandwidth and channel delay spread. An option of choosing d (but not limited to) can be d=$\lfloor N/B \rfloor$, where B is the number of subcarriers used by RS within the symbol. In this way, the introduced phase rotation in frequency domain will increase linearly from 0 to $2\pi$ across the RS subcarriers. In one or more embodiments, the value of d is set as a medium level such that, on one hand, it is not too large and thus transparent RS can still be exploited and the corresponding channel estimation will not be degraded significantly; on the other hand, it is not too small and thus enough frequency selectivity can be added. When the multi-antenna scheme is transparent to the receiver, i.e., receiver circuitry 32, the effects resulting from CDD are included in the effective channel response (i.e., the effective channel response shows increased frequency selectivity). By the phase-rotation precoder of wireless device, more frequency diversity can be added to the effective channel. Besides, the RS sequence p is the same RS sequence used for LTE Rel-14. In this way, both Rel-15 wireless devices and Rel-14 wireless devices are able to estimate the effective channel based on the RS symbol. Here the effective channel includes the effects of both physical channel and transmitter precoding. Also, both Rel-15 wireless device and Rel-14 wireless device can utilize the RS symbol to measure RSRP by coherent calculation.

The above embodiments that are described with respect to RS insertion can be also applied generally to a signal such as a RS signal, data signal, etc. In this embodiment, the same signal is transmitted through different antenna ports, where different antenna ports apply different cyclic shift values to implement CDD.

Figure 11:
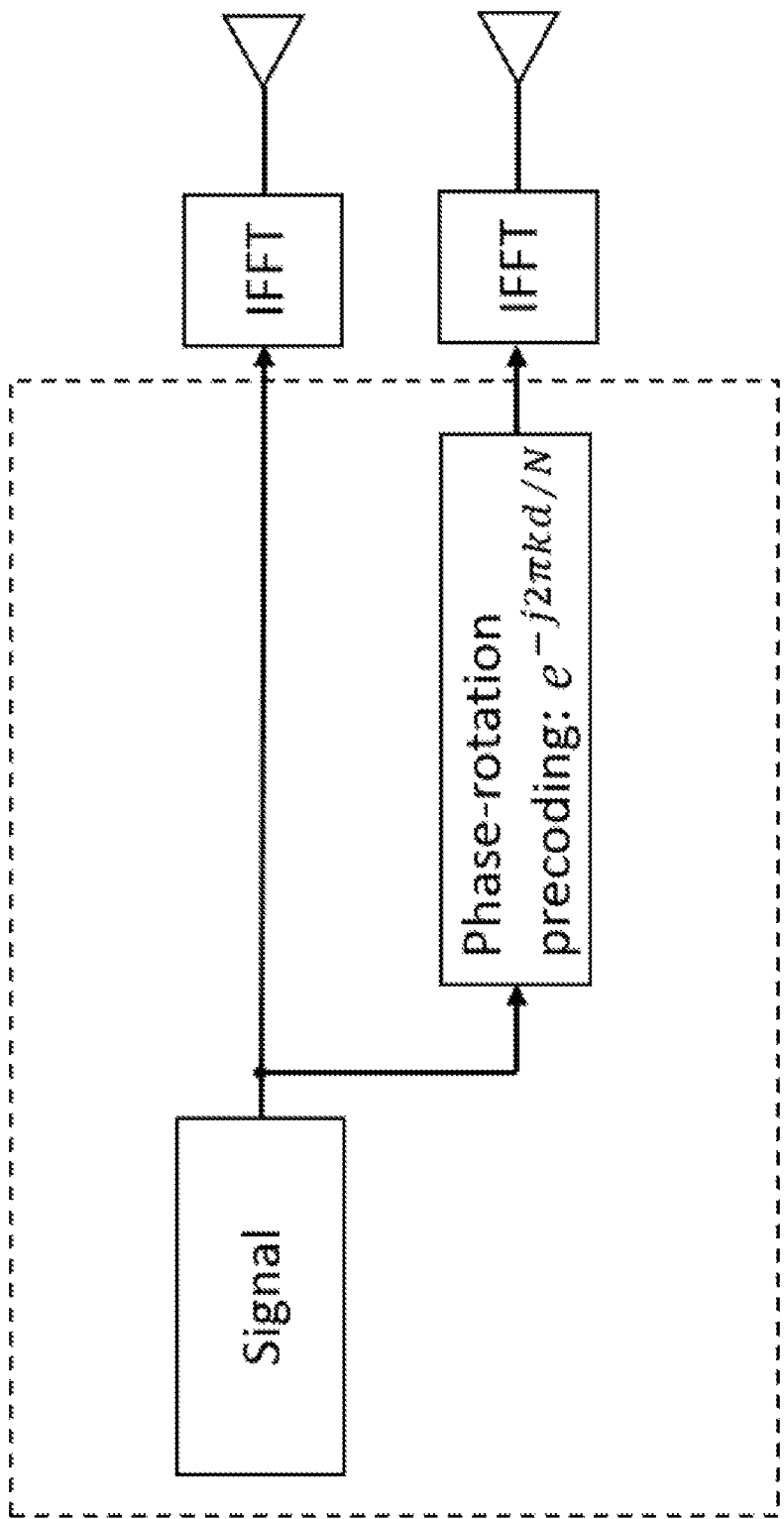
FIG. 11 is a block diagram of an exemplary implementation of CDD in the frequency domain in accordance with the principles of the disclosure.

An example of two antenna ports is given in FIG. 11, where the second antenna port applies CDD with cyclic shift d. Besides, when the signal contains different types of transmissions (e.g., SA and data), one or more cyclic shifts can be applied to each antenna port. The value of cyclic shift d depends on the bandwidth of the considered transmission. An option of choosing d (but not limited to) can be d=$\lfloor N/B \rfloor$, where N is the FFT size and B is the number of subcarriers used by the considered transmission. Furthermore, to give a constraint on the linearly increased phase rotation in frequency domain, an upper bound $d_{max}$ is set, and a lower bound $d_{min}$ is set on the selected cyclic shift. Specifically, on one hand, if $B > B_{th1}$, then $d=d_{min}$; on the other hand, if $B < B_{th2}$, then $d=d_{max}$. Here $B_{th1}$ and $B_{th2}$ are two thresholds on the number of used subcarriers.

Embodiment 1.2

In some embodiments, precoder cycling is applied to RS transmissions with a pre-defined codebook. In this case, the multi-antenna scheme is transparent to the receiver, i.e., receiver circuitry 32, which means that the precoding effects are embedded into the channel response (i.e., the effective channel response shows increased frequency selectivity). Hence, both Rel-15 wireless devices 14 and Rel-14 wireless devices 14 are able to blindly detect the RS symbol and then estimate the effective channel based on the RS symbol. Here the effective channel includes the effects of both physical channel and transmitter precoding. Also, both Rel-15 wireless devices 14 and Rel-14 wireless devices 14 can utilize the RS symbol to measure RSRP by coherent calculation.

Embodiment 1.3

In some embodiments, different RS sequences p_(d,Tx1) and p_(d,Tx2) are transmitted from the two Tx antenna ports, respectively. By using the two RS sequences, the following is achieved 1) a Rel-14 receiver is still able to measure the PSSCH-RSRP of Rel-15 V2X transmissions by coherent calculation, without significant performance loss; 2) a Rel-15 receiver is able to distinguish and estimate the channels from the two antenna ports respectively, thereby facilitating receiver combining algorithms that take advantage of transmit diversity gain; and 3) cubic metric (CM) properties of the transmitted signal will not be severely degraded. Alternatives of the two RS sequences are described as follow.

Figure 12:
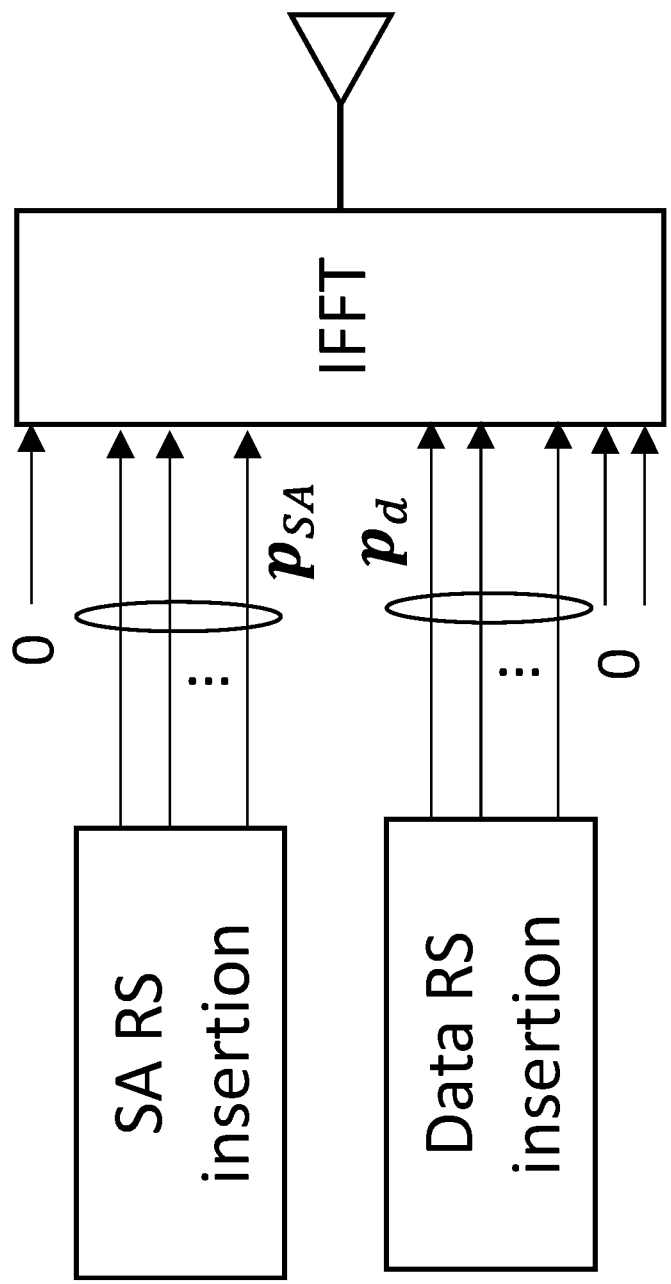
FIG. 12 is a configuration for RS transmission in Rel-14.

Alternative 1—In this alternative that is described with respect to RS (although this alternative is equally applicable to other signals and/or transmissions), the extended Zadoff-Chu sequence $p_d=[s_1, s_2, \ldots s_M]$ corresponding to data RS transmissions in Rel-14 (illustrated in FIG. 12) is split into two parts and the two parts are transmitted through the two antenna ports respectively. In particular, FIG. 12 is a configuration for RS transmission in Rel-14. In this disclosure, the extended Zadoff-Chu sequence means a potentially cyclically extended Zadoff-Chu sequence, which is commonly used as the RS in LTE UL and LTE D2D/V2X. More specifically, the RS symbols transmitted from the two antenna ports are the following:

From the first antenna port, the sequence $p_{d,Tx1}=[s_1, 0, s_3, \ldots, 0, s_{M-1}, 0]$, is transmitted.

Figure 13:
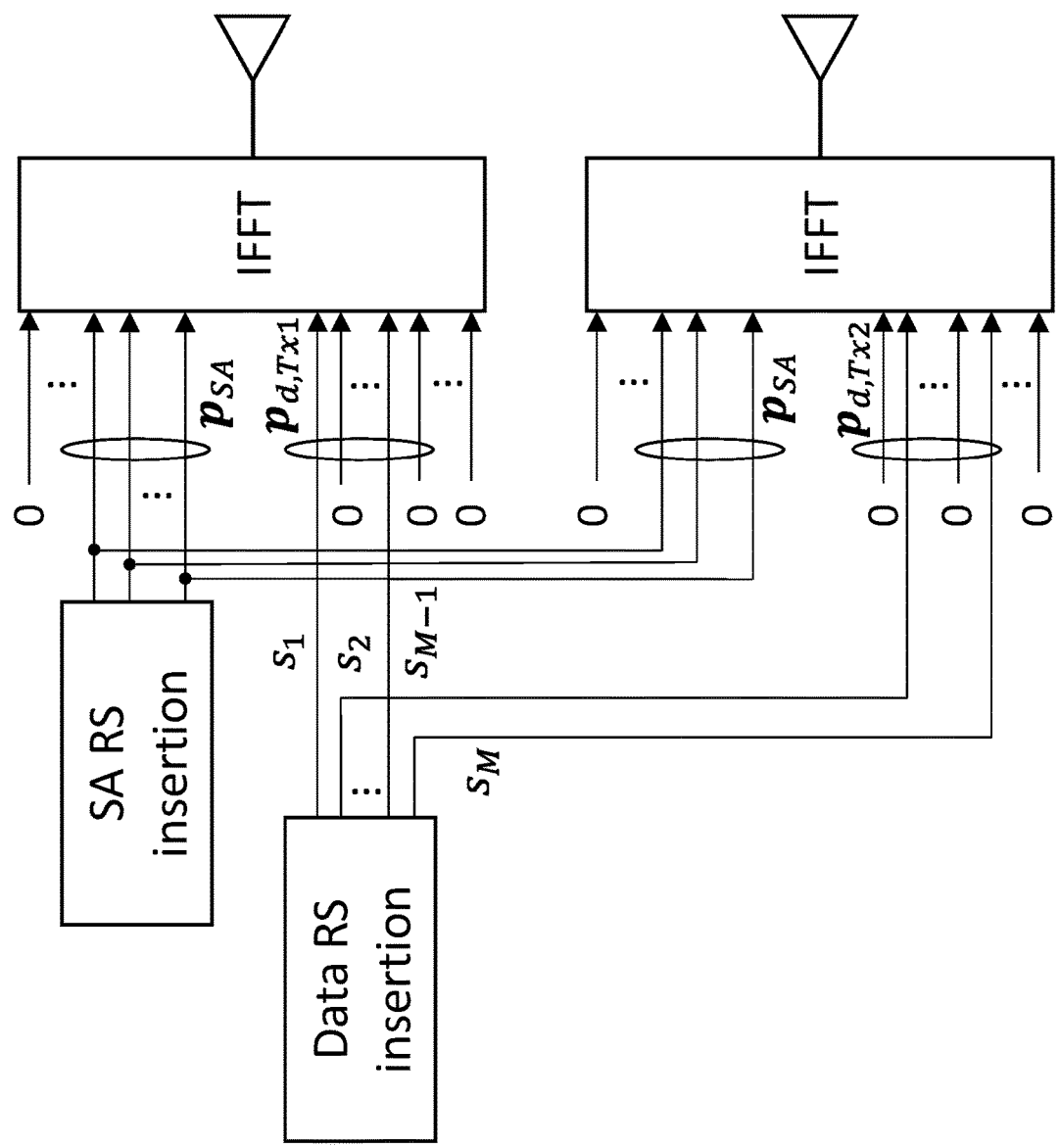
FIG. 13 is an example of RS transmission in Rel-15, are applied to data RS in accordance with the principles of the disclosure.

From the second antenna port, the sequence $p_{d,Tx2}=[0, s_2, 0, s_4, \ldots, 0, s_M]$ is transmitted An illustration of Alternative 1 is given in FIG. 13, where Alternative 1 is applied to the data RS transmission. FIG. 13 is an example of RS transmission in Rel-15, where Alternative 1 of Embodiment 1.3 is applied to data RS. In this way, a Rel-14 receiving wireless device can perform PSSCH-RSRP measurements without significant impact from the TX transmission scheme. Also, the comb structure of RS enables a Rel-15 receiver to estimate the channels from the two Tx antenna ports respectively. Note that in FIG. 7 we do not apply any diversity scheme to SA RS transmission, since the focus of the illustration is on data RS. In fact, SA RS can adopt the diversity schemes described in Embodiments 1.1 and 1.2.

In some cases, some additional restrictions may be included to ensure that the resulting sequences $p_{d,Tx1}$ and $p_{d,Tx2}$ have low CM. For example, in Rel-14 the sequence of RS symbols associated with a data transmission depends on the CRC of the bits in the corresponding SA. Some SA field values or combinations of values may be precluded; or some of the reserved or unspecified bits in the SA may be set to reduce CM. Other ways of splitting $p_d$ into $p_{d,Tx1}$ and $p_{d,Tx2}$ are possible (e.g., alternating in groups of Nt symbols, for example $p_{d,Tx1}=[s_1, s_2, 0, 0, \ldots, s_{M-3}, s_{M-2}, 0, 0]$ for Nt=2). Generalizations to more than two antenna ports are also possible (e.g., by choosing Nt equal to the number of antenna ports).

In another example that is generally applicable to different signals, i.e., transmission such as SA transmission, data transmission, etc., the samples of the signal are split into different parts, and the different parts are transmitted through different antenna ports. Here by samples, it is meant that the modulated symbols carried by resource elements/subcarriers in frequency domain.

Figure 14:
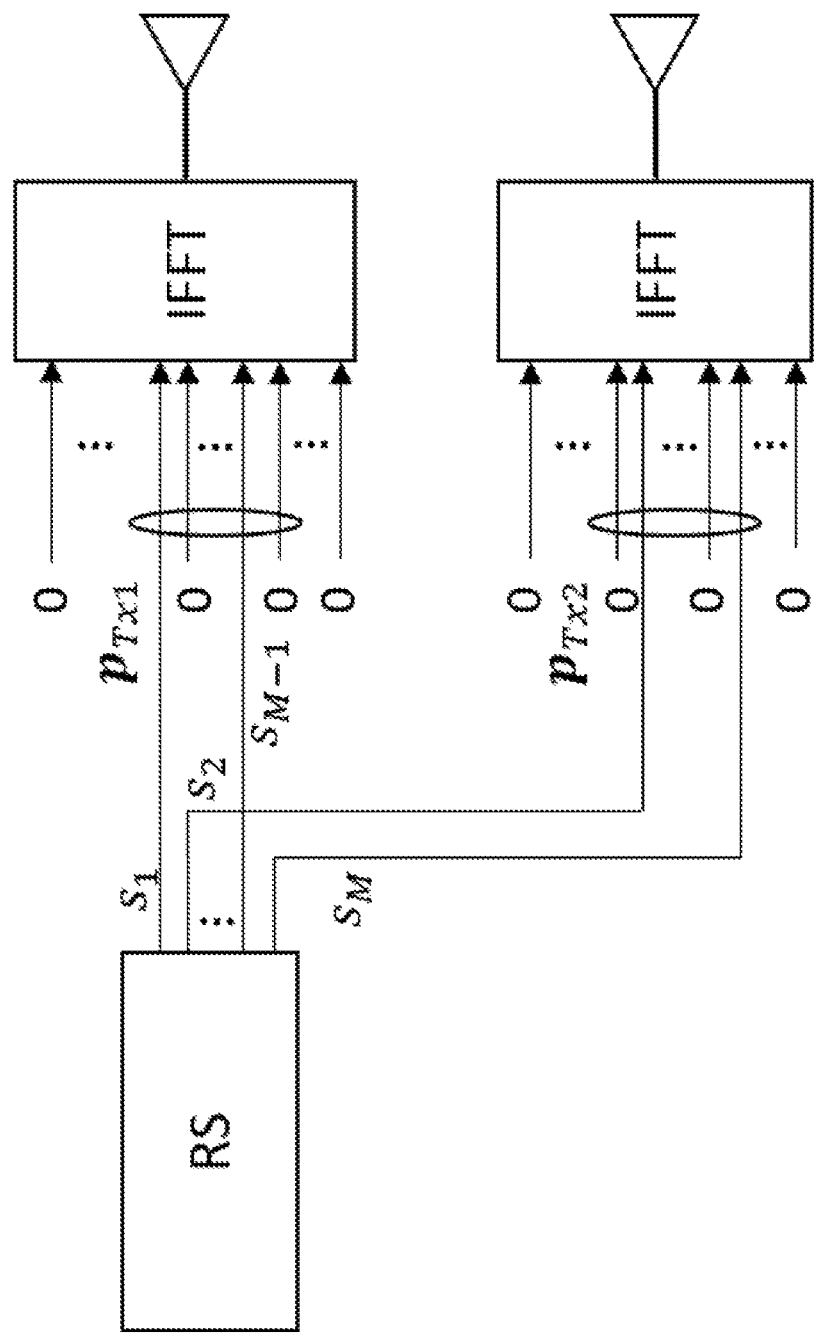
FIG. 14 is a block diagram of for an implementation using RS transmission in accordance with the principles of the disclosure.

Consider an example of two antenna ports and the transmitted signal is RS. In the example, denote the RS by an extended Zadoff-Chu sequence=$[s_1, s_2, \ldots, s_M]$, which means that the RS symbol uses M resource elements/subcarriers in frequency domain. In this disclosure, the extended Zadoff-Chu sequence means a potentially cyclically extended Zadoff-Chu sequence, which is commonly used as the RS in LTE UL and LTE D2D/V2X. Then, the sequence p is split into two parts and the two parts are transmitted through the two antenna ports respectively. More specifically, the sequences transmitted from the two antenna ports are the following, which is also illustrated in FIG. 14.

From the first antenna port, the sequence $p_{Tx1}=[s_1, 0, s_3, \ldots, 0, s_{M-1}, 0]$, is transmitted.

From the second antenna port, the sequence $p_{Tx2}=[0, s_2, 0, s_4, \ldots, 0, s_M]$ is transmitted.

Alternative 2

In this alternative that is described in terms of RS (although this alternative is equally applicable to other signals and/or transmissions), $p_{d,Tx1}$ is set as the same RS sequence corresponding to data RS transmissions in Rel-14, where the sequence length is M. In this way, when the RS is associated with data transmission, a Rel-14 receiver is still able to measure the PSSCH-RSRP of Rel-15 V2X transmissions by coherent calculation. On the other hand, $p_{d,Tx2}$ is defined as a comb-like sequence where a RS sequence such as an extended Zadoff-Chu sequence with length M/2 is placed at every second subcarrier in frequency domain. That is, $p_{d,Tx2}=[0, s_1, 0, s_2, \ldots, 0, s_{M/2}]$, where $[s_1, s_2, \ldots, s_{M/2}]$ is an extended Zadoff-Chu sequence with length M/2. In this way, a Rel-15 receiver is able to distinguish and estimate the channels from the two Tx antenna ports respectively. At the same time, the CM properties of the transmitted signal will not be degraded compared to that of Rel-14 signals.

The sequence $p_{d,Tx2}$ is chosen to increase the reliability of the PSSCH-RSRP measurement, e.g., by choosing a sequence $p_{d,Tx2}$ that has higher cross-correlation with the sequence $p_{d,Tx1}$.

Moreover, we set the Tx power of the first Tx antenna as $aP_{sum}$ and the second Tx antenna as $(1-a)P_{sum}$, where $P_{sum}$ is the sum power constraint of the transmitter. Also, to ensure a good PSSCH-RSRP measurement at Rel-14 wireless devices 14, the range of a is in general set as 0.5<a≤1. Note that when a=1, the transmission of Rel-15 wireless device 14 is considered as a fallback mode, i.e., single antenna transmission.

The values of the power sharing factor may be fixed in the specification, or set as a function of some parameters (e.g., modulation and coding scheme, a priority value such as PPPP, a transmission power value, a synchronization source, etc.); or it may be up to wireless device 14 implementation.

Generalizations to more than two antenna ports are possible. For example, each antenna port i, where i=2, . . . , Nt, uses an extended Zadoff-Chu sequence with length M/Nt for RS transmission and the sequence is placed at every i-th subcarrier in frequency domain.

In another example, that is applicable to various signals, i.e., transmission such as SA and data transmissions, different signal sequences are transmitted through different antenna ports, where the sequences can have different length. In other words, at some antenna ports, only partial of the resource elements/subcarriers are used for transmission.

Consider an example of two antenna ports and the transmitted signal is RS. RS transmitted through the first antenna port is set as an extended Zadoff-Chu sequence $p_{Tx1}$ with length M. Moreover, $p_{Tx2}$ is defined as a comb-like RS sequence where an extended Zadoff-Chu sequence with length M/2 is placed at every second subcarrier in frequency domain. More specifically, the sequences transmitted from the two antenna ports are the following.

From the first antenna port, an extended Zadoff-Chu sequence $p_{Tx1}=[s_1, s_2, s_3, \ldots, s_M]$ is transmitted.

From the second antenna port, the sequence $p_{Tx2}=[0, s'_1, 0, s'_2, \ldots, 0, s'_{M/2}]$ is transmitted, where $[s'_1, s'_2, \ldots, s'_{M/2}]$ is an extended Zadoff-Chu sequence with length M/2.

Alternative 3

In this alternative, $p_{d,Tx1}$ is set as the same RS sequence corresponding to data RS transmissions in Rel-14, where the sequence length is M. In this way, when the RS is associated with data transmission, a Rel-14 receiver is still able to measure the PSSCH-RSRP of Rel-15 V2X transmissions by coherent calculation. On the other hand, $p_{d,Tx2}$ is defined as a cyclic time-shifted version of $p_{d,Tx1}$ such that $p_{d,Tx1}$ and $p_{d,Tx2}$ are orthogonal. In this way, a Rel-15 receiver is able to distinguish and estimate the channels from the two Tx antenna ports respectively. At the same time, the CM properties of the transmitted signal will not be degraded compared to that of Rel-14 signals.

Moreover, similar with Alternative 2, the Tx power of the first Tx antenna is set as $aP_{sum}$ and the second Tx antenna as $(1-a)P_{sum}$, where $P_{sum}$ is the sum power constraint of the transmitter. Also, to ensure a good PSSCH-RSRP measurement at Rel-14 wireless devices 14, the range of a is in general set as 0.5<a≤1. Note that when a=1, the transmission of Rel-15 wireless device 14 is considered as a fallback mode, i.e., single antenna transmission.

Similar with Alternative 2, the values of the power sharing factor a may be fixed in the specification, or set as a function of some parameter (e.g., modulation and coding scheme, a priority value such as ProSe per packet priority (PPPP), a transmission power value, a synchronization source, etc.); or it may be up to wireless device 14 implementation.

Generalizations to more than two antenna ports are possible. For example, each antenna port i, where i=2, . . . , Nt, adopts a different cyclic shift with respect to the RS sequence used for antenna port 1 such that any two used RS sequences are orthogonal.

Embodiments on Multi-Antenna Transmission Schemes for Payload Symbols

In these embodiments, multi-antenna transmission schemes for payload symbols are described, i.e., symbols #0, #1, #3, #4, #6, #7, #9, #10, #12, and #13 in a subframe (see FIG. 2). Payload symbols may refer to data and control information. In these embodiments RS are not included in the payload.

Embodiment 2.1

In some embodiments, CDD with a cyclic delay d is applied to payload symbols and implement it in frequency domain as a phase-rotation precoding. The processing, i.e., steps, here is similar with the processing in Embodiment 1.1. In this case, by choosing an appropriate d as explained in Embodiment 1.1, the multi-antenna scheme is transparent to the receiver. Hence, both Rel-15 and Rel-14 wireless devices 14 are able to decode the payload symbols.

Embodiment 2.2

In some embodiments, precoder cycling is applied to payload transmissions with a pre-defined codebook as described Embodiment 1.2. In this case, the multi-antenna scheme can be transparent to the receiver. Hence, both Rel-15 and Rel-14 wireless devices 14 are able to decode the payload symbols.

Embodiment 2.3

In some embodiments, more sophisticated and/or robust diversity schemes can be applied for improving reliability, e.g., to data payload transmissions since they do not need to be decoded by Rel-14 receivers. Alternatives include, but not limited to, Alamouti STBC and Alamouti SFBC (or modified Alamouti SFBC). This is further enabled by the proposed RS structure described in Embodiment 1.3, since the channels can be estimated from the two antenna ports respectively. In this case, similar to Embodiment 1.3, the Tx power of the first Tx antenna is set as $aP_{sum}$ and the second Tx antenna as $(1-a)P_{sum}$, where $P_{sum}$ is the sum power constraint of the transmitter and $0.5 < a \leq 1$.

Generalizations to more than two antenna ports are also possible (e.g., by combining Alamouti SFBC with FSTD).

Combinations of Embodiments

Figure 15:
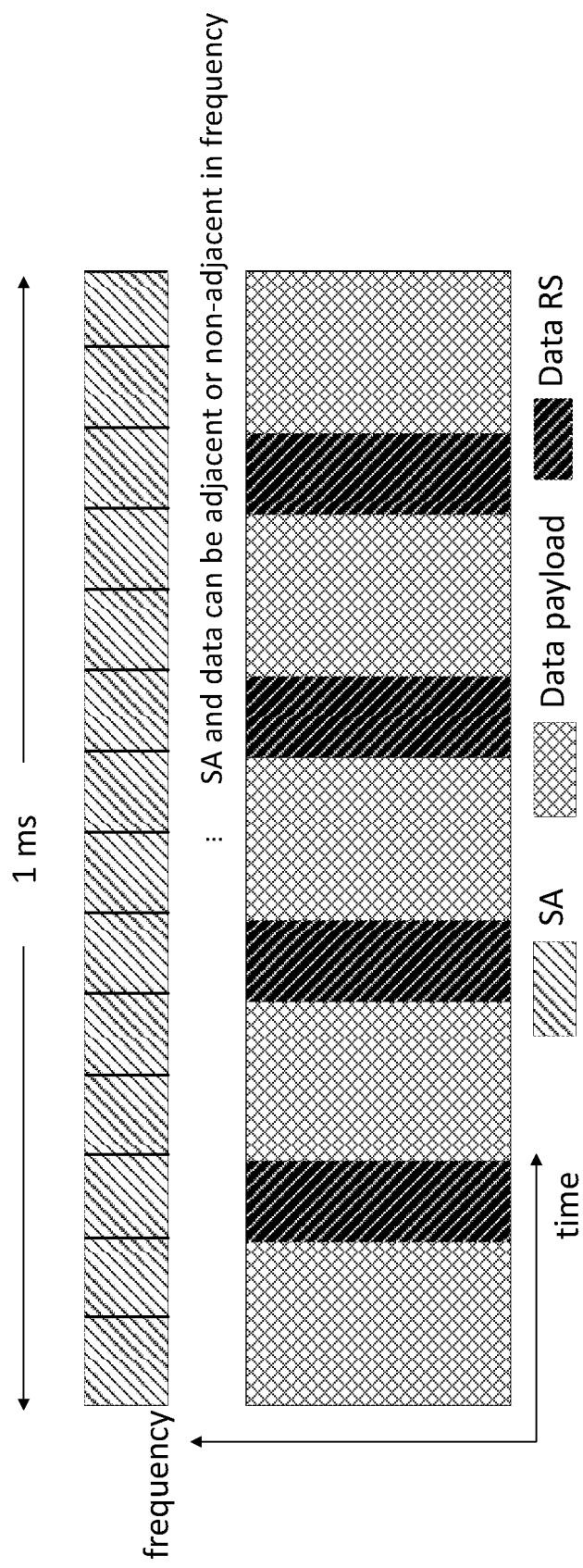
FIG. 15 is a block diagram of three categories of transmissions in accordance with the principles of the disclosure.

For Rel-15 V2X, to achieve the goal of both exploiting multi-antenna diversity and maintaining efficient coexistence with Rel-14 wireless devices 14, three categories of transmissions is described: SA transmission (including both RS and payload), transmission of data RS, and transmission of data payload, as illustrated in FIG. 15. In particular, FIG. 15 is a block diagram of three categories of transmissions. Note that SA transmission and its associated data transmission can be either adjacent or non-adjacent in frequency.

In fact, the three categories of transmissions have different requirements and constraints.

For SA transmission, it needs to be decodable by a Rel-14 wireless device 14 receiver, which means that the multi-antenna processing of SA should be transparent to the receiver.

The data RS transmission should be usable by a Rel-14 receiver to measure PSSCH-RSRP (according to the Rel-14 procedures) as well as by a Rel-15 receiver to do channel estimation for decoding the corresponding data payload.

The data payload does not need to be decodable by Rel-14 receivers, and thus backward compatibility is not required for Rel-15 wireless devices 14. Therefore, more robust diversity schemes can be used to improve reliability.

To achieve the above requirements, there are several ways to combine the embodiments for SA and data transmissions. Below there is listed several combinations.

Combination 1: Embodiment 1.1 for Both SA RS and Data RS & Embodiment 2.1 for Both SA Payload and Data Payload In this combination, CDD is utilized for both RS and payload transmissions. More specifically, cyclic delay $d_1$ is applied to SA (including both RS and payload) and cyclic delay $d_2$ to data (including both RS and payload). In general, $d_1$ and $d_2$ have different values since SA and data transmissions usually have different bandwidth. Note that if SA and data have similar bandwidth, the values of $d_1$ and $d_2$ may also be the same or similar. The potentially different values of $d_1$ and $d_2$ can enable SA and data transmissions to exploit good diversities from their own perspectives. In this combination, the multi-antenna scheme of Rel-15 transmitter is transparent to receivers.

Combination 2: Embodiment 1.2 for Both SA RS and Data RS & Embodiment 2.2 for Both SA Payload and Data Payload In this combination, precoder cycling is applied to both RS and payload transmissions. More specifically, a pre-defined codebook for SA (including both RS and payload) and another pre-defined codebook for data (including both RS and payload), is used. In general, the two pre-defined codebooks are different since SA and data transmissions usually have different bandwidth. Note that if SA and data have similar bandwidth, the two codebooks may also be the same or similar. The potentially different codebooks can enable SA and data transmissions to exploit good diversities from their own perspectives. In this combination, the multi-antenna scheme of Rel-15 transmitter is transparent to receivers.

Figure 16:
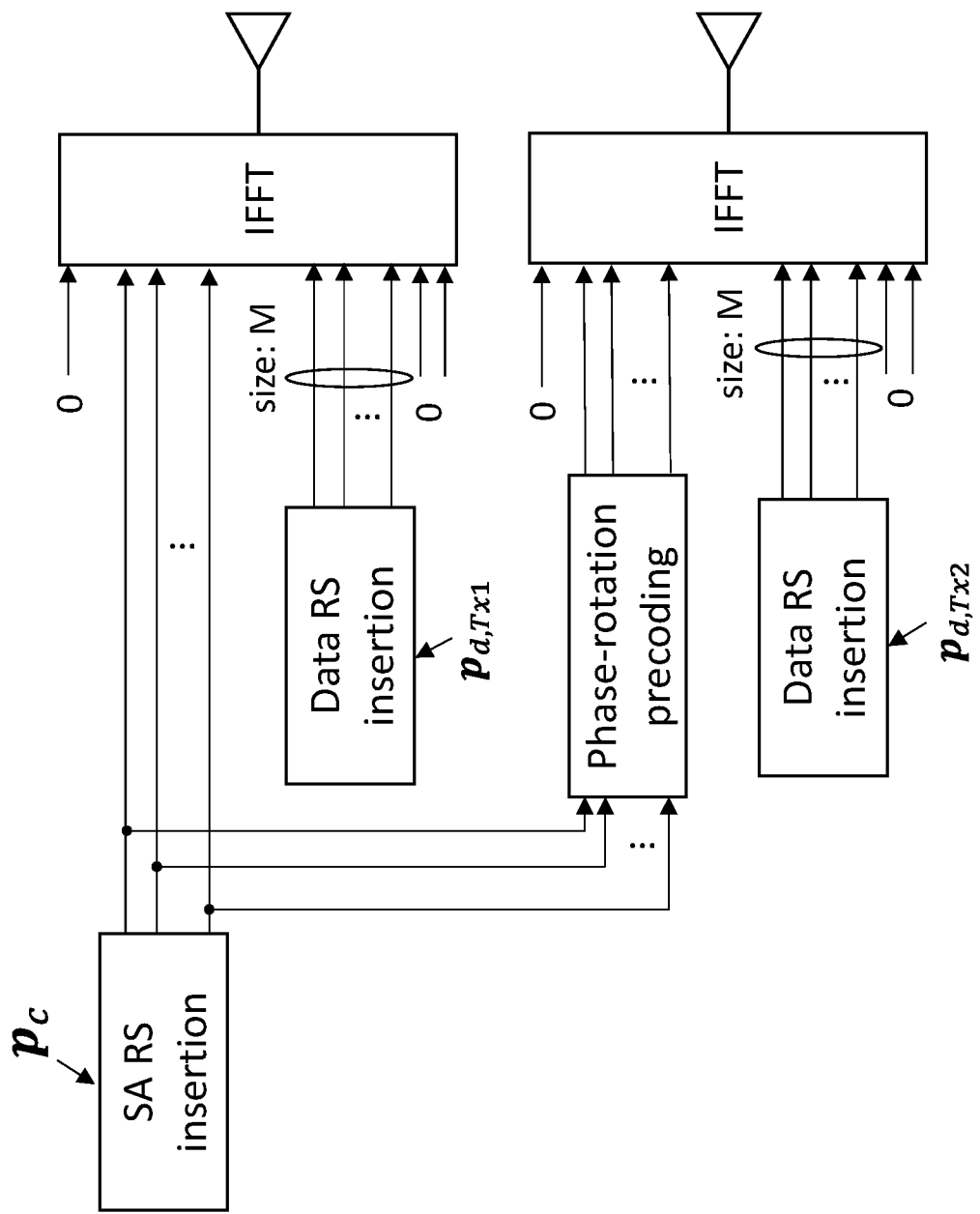
FIG. 16 is a block diagram of RS transmission in combination in accordance with the principles of the disclosure.

Combination 3: Embodiment 1.1 for SA RS & Embodiment 1.3 for Data RS & Embodiment 2.1 for SA Payload & Embodiment 2.3 for Data Payload In this combination, the multi-antenna scheme of SA transmission (including both RS and payload) is transparent to the receivers due to the used CDD. In this way, a Rel-14 receiver, i.e., receiver circuitry 32 and/or processing circuitry 34, is able to read and decode the SA of a Rel-15 wireless device 14. Moreover, in data transmission, the design of RS symbols (i.e., Embodiment 1.3) enables that 1) a Rel-14 receiver can measure the PSSCH-RSRP (according to the Rel-14 procedures) of a Rel-15 transmission without significant performance loss; 2) a Rel-15 receiver can estimate the channels from the two antenna ports respectively. An illustration of RS transmission is given in FIG. 16. FIG. 16 is a block diagram of RS transmission in combination 3, described herein. Furthermore, in data payload transmission, Embodiment 2.3 allows us to exploit more sophisticated and robust diversity schemes. Promising candidates include Alamouti STBC and Alamouti SFBC (or modified SFBC). Note that even though Alamouti STBC is not used in LTE, it may be a good option here since data payload transmissions are always mapped to adjacent symbols in time domain, as shown in FIG. 15. Additionally, even though the conventional Alamouti SFBC breaks the single-carrier property of SC-OFDM, there have been some studies to handle this problem. These modified SFBC schemes can also be utilized here.

Combination 4: Embodiment 1.2 for SA RS & Embodiment 1.3 for Data RS & Embodiment 2.2 for SA Payload & Embodiment 2.3 for Data Payload This combination is similar with Combination 3, except that we substitute precoder cycling for CDD used in RS transmissions.

Therefore, the disclosure provides the use of different multi-antenna transmission schemes within one symbol. Specifically, for LTE Rel-15 V2X wireless devices 14, since SA, data RS, and data payload transmissions have their own requirements and constraints, different multi-antenna transmission schemes are applied to them. In this way, not only multi-antenna diversity can be exploited by Rel-15 wireless devices 14, but also efficient coexistence can be achieved when deploying Rel-15 and Rel-14 wireless devices 14 in the same resource pools.

Figure 17:
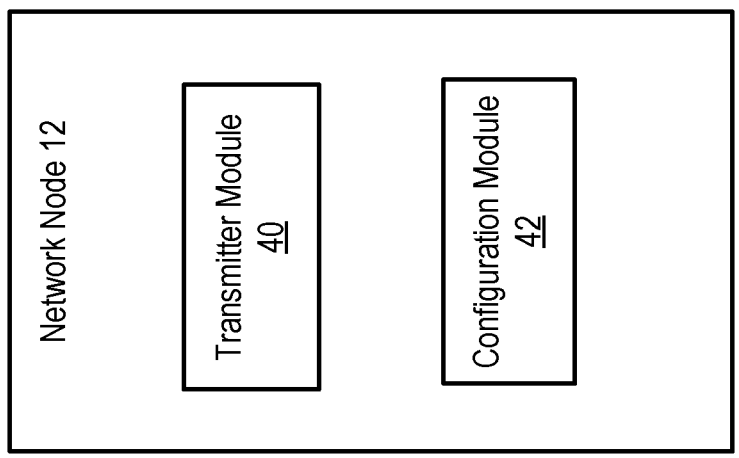
FIG. 17 is a block diagram of an alternative embodiment of exemplary network node 12 in accordance with the principles of the disclosure.

FIG. 17 is a block diagram of an alternative embodiment of exemplary network node 12 in accordance with the principles of the disclosure. Transmitter module 40 is configured to perform the transmission functions described herein such as those described with respect to transmitter circuitry 20. Configuration module 42 is configured to perform the functions described herein such as those described with respect to configuration code 18.

Figure 18:
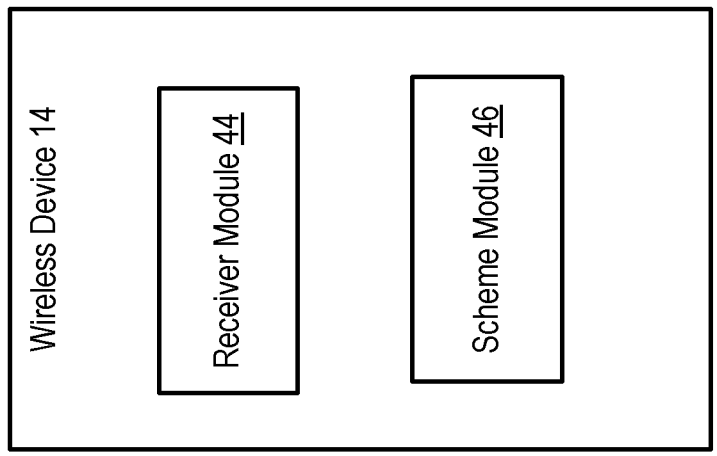
FIG. 18 is a block diagram of an alternative embodiment of exemplary wireless device 14 in accordance with the principles of the disclosure.

FIG. 18 is a block diagram of an alternative embodiment of exemplary wireless device 14 in accordance with the principles of the disclosure. Receiver module 44 is configured to perform the reception functions described herein such as those described with respect to receiver circuitry 32. Scheme module 46 is configured to perform the functions described herein such as those described with respect to scheme code 16.

| Abbreviation | Explanation |
| --- | --- |
| CAM | Cooperative Awareness Message |
| CDD | Cyclic Delay Diversity |
| CE | Channel Estimation |
| CM | Cubic Metric |
| CRC | Cyclic Redundancy Check |
| CRS | Cell-Specific Reference Signal |
| D2D | Device-to-Device Communication |
| DENM | Decentralized Environmental Notification Message |
| DFT | Discrete Fourier transform |
| DFTS-ODFM | DFT spreading OFDM |
| DL | Downlink |
| DMRS | Demodulation Reference Signal |
| ETSI | European Telecommunications Standards Institute |
| FFT | Fast Fourier Transform |
| FSTD | Frequency-Switched Transmit Diversity |
| IFFT | Inverse Fast Fourier Transform |
| LTE | Long-Term Evolution |
| NR | New Radio |
| NW | Network |
| OFDM | Orthogonal Frequency-Division Multiplexing |
| PDSCH | Physical Downlink Shared Channel |
| PPPP | ProSe Per Packet Priority |
| ProSe | Proximity Services |
| RS | Reference Signal |
| RSRP | Reference Signal Received Power |
| Rx | Receiver |
| SA | Scheduling Assignment |
| SFBC | Space Frequency Block Coding |
| STBC | Space Time Block Coding |
| TM | Transmission Mode |
| Tx | Transmitter |
| UE | User Equipment |
| UL | Uplink |
| V2I | Vehicle-to-Infrastructure |
| V2P | Vehicle-to-Pedestrian |
| V2V | Vehicle-to-vehicle communication |
| V2X | Vehicle-to-anything-you-can-imagine |

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object-oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings.

EMBODIMENTS

Embodiment 1

A wireless device configured for transmission using a transmission scheme other than a multi-antenna transmission scheme, the wireless device comprising:
 at least one receiver configured to receive a transmission of a multi-antenna transmission scheme; and
 processing circuitry configured to:
  perform at least one of a channel estimation function and measurement function using the received transmission of the multi-antenna transmission scheme, the multi-antenna transmission scheme remaining transparent to the wireless device.

Embodiment 2

The wireless device of Embodiment 1, wherein the transmission of the multi-antenna transmission scheme includes a symbol, the symbol having cyclic delay diversity.

Embodiment 3

The wireless device of Embodiment 1, wherein the transmission of the multi-antenna transmission scheme includes a symbol, the multi-antenna transmission scheme corresponds to a precoder cycling applied to the symbol.

Embodiment 4

The wireless device of Embodiment 1, wherein the transmission of the multi-antenna transmission scheme includes a symbol, the symbol includes two sequences as part of the multi-antenna transmission scheme.

Embodiment 5

The wireless device of Embodiment 4, wherein the two sequences correspond to respective parts of an extended Zadoff-Chu sequence.

Embodiment 6

The wireless device of Embodiment 4, wherein the two sequences include a first sequence and a second sequence, the first sequence having a length of M, the second sequence having a length of M/2.

Embodiment 7

The wireless device of Embodiment 4, wherein the two sequences include a first sequence and a second sequence, the second sequence being a cyclic time-shifted version of the first sequence, the first sequence being orthogonal to the second sequence.

Embodiment 8

The wireless device of Embodiment 1, wherein the received transmission of the multi-antenna transmission scheme includes a scheduling assignment and data;
 the scheduling assignment having a first cyclic delay; and
 the data having a second cyclic delay different from the first cyclic delay.

Embodiment 9

The wireless device of Embodiment 1, wherein the received transmission of the multi-antenna transmission scheme includes a scheduling assignment and data;
 the scheduling assignment having a first precoder cycling; and
 the data having a second precoder cycling different from the first precoder cycling.

Embodiment 10

The wireless device of Embodiment 1, wherein the received transmission of the multi-antenna transmission scheme includes a scheduling assignment and data;
 the scheduling assignment having a first cyclic delay diversity; and
 the data having a second cyclic delay diversity different from the first cyclic delay diversity.

Embodiment 11

The wireless device of Embodiment 1, wherein the multi-antenna transmission scheme is a multi-antenna transmission scheme for a payload symbol.

Embodiment 12

The wireless device of Embodiment 1, wherein the multi-antenna transmission scheme is a multi-antenna transmission scheme for a reference signal symbol.

Embodiment 13

The wireless device of Embodiment 1, wherein the measurement function includes measuring a Physical Sidelink Shared Channel-Reference Signal Received Power, PSSCH-RSRP, based on the received transmission of the multi-antenna transmission scheme.

Embodiment 14

The wireless device of Embodiment 1, wherein the channel estimation function includes estimating an effective channel.

Embodiment 15

A method of a wireless device configured for transmission using a transmission scheme other than a multi-antenna transmission scheme, the method comprising:
 receiving a transmission of a multi-antenna transmission scheme; and
 performing at least one of a channel estimation function and measurement function using the received transmission of the multi-antenna transmission scheme, the multi-antenna transmission scheme remaining transparent to the wireless device.

Embodiment 16

The method of Embodiment 15, wherein the transmission of the multi-antenna transmission scheme includes a symbol, the symbol having cyclic delay diversity.

Embodiment 17

The method of Embodiment 15, wherein the transmission of the multi-antenna transmission scheme includes a symbol, the multi-antenna transmission scheme corresponds to a precoder cycling applied to the symbol.

Embodiment 18

The method of Embodiment 15, wherein the transmission of the multi-antenna transmission scheme includes a symbol, the symbol includes two sequences as part of the multi-antenna transmission scheme.

Embodiment 19

The method of Embodiment 18, wherein the two sequences correspond to respective parts of an extended Zadoff-Chu sequence.

Embodiment 20

The method of Embodiment 18, wherein the two sequences include a first sequence and a second sequence, the first sequence having a length of M, the second sequence having a length of M/2.

Embodiment 21

The method of Embodiment 18, wherein the two sequences include a first sequence and a second sequence, the second sequence being a cyclic time-shifted version of the first sequence, the first sequence being orthogonal to the second sequence.

Embodiment 22

The method of Embodiment 15, wherein the received transmission of the multi-antenna transmission scheme includes a scheduling assignment and data;
the scheduling assignment having a first cyclic delay; and
the data having a second cyclic delay different from the first cyclic delay.

Embodiment 23

The method of Embodiment 15, wherein the received transmission of the multi-antenna transmission scheme includes a scheduling assignment and data;
the scheduling assignment having a first precoder cycling; and
the data having a second precoder cycling different from the first precoder cycling.

Embodiment 24

The method of Embodiment 15, wherein the received transmission of the multi-antenna transmission scheme includes a scheduling assignment and data;
the scheduling assignment having a first cyclic delay diversity; and
the data having a second cyclic delay diversity different from the first cyclic delay diversity.

Embodiment 25

The method of Embodiment 15, wherein the multi-antenna transmission scheme is a multi-antenna transmission scheme for a payload symbol.

Embodiment 26

The method of Embodiment 15, wherein the multi-antenna transmission scheme is a multi-antenna transmission scheme for a reference signal symbol.

Embodiment 27

The method of Embodiment 15, wherein the measurement function includes measuring a Physical Sidelink Shared Channel-Reference Signal Received Power, PSSCH-RSRP, based on the received transmission of the multi-antenna transmission scheme.

Embodiment 28

The method of Embodiment 15, wherein the channel estimation function includes estimating an effective channel.

Embodiment 29

A wireless device configured for transmission using a transmission scheme other than a multi-antenna transmission scheme, the wireless device comprising:
receiver module configured to receive a transmission of a multi-antenna transmission scheme; and
scheme module configured to perform at least one of a channel estimation function and measurement function using the received transmission of the multi-antenna transmission scheme, the multi-antenna transmission scheme remaining transparent to the wireless device.

Embodiment 30

A network node, comprising;
processing circuitry configured to determine a transmission scheme for a wireless device, the wireless device configured for multi-antenna transmission scheme transmission;
transmitter circuitry configured to signal the multi-antenna transmission scheme transmission to the wireless device for transmission by the wireless device; and
the multi-antenna transmission scheme transmission being usable by another wireless device that is configured for transmission using a transmission scheme other than a multi-antenna transmission scheme for performing at least one of a channel estimation function and measurement function.

Embodiment 31

A network node, comprising;
configuration module configured to determine a transmission scheme for a wireless device, the wireless device configured for multi-antenna transmission scheme transmission;

transmitter module configured to signal the multi-antenna transmission scheme transmission to the wireless device for transmission by the wireless device; and the multi-antenna transmission scheme transmission being usable by another wireless device that is configured for transmission using a transmission scheme other than a multi-antenna transmission scheme for performing at least one of a channel estimation function and measurement function.

The invention claimed is:

1. A wireless device configured for transmission using a transmission scheme other than a multi-antenna transmission scheme, the wireless device comprising:
at least one receiver configured to:
receive a transmission of the multi-antenna transmission scheme; and
processing circuitry configured to:
perform at least one of a channel estimation function and a measurement function using the received transmission of the multi-antenna transmission scheme, the multi-antenna transmission scheme remaining transparent to the wireless device.

2. The wireless device of claim 1, wherein the transmission of the multi-antenna transmission scheme includes a symbol, the symbol having cyclic delay diversity.

3. The wireless device of claim 2, wherein the cyclic delay diversity is applied with a cyclic delay, and wherein the cyclic delay is dependent on reference signal bandwidth and channel delay spread.

4. The wireless device of claim 2, wherein the cyclic delay diversity is applied with a cyclic delay, the cyclic delay causing a transparent reference signal to be exploited and a corresponding channel estimation to remain above a predetermined threshold, and allowing a frequency selectivity to be added.

5. The wireless device of claim 2, wherein the cyclic delay diversity is applied with a cyclic delay, and wherein the cyclic delay is a Fast Fourier Transform (FFT) size divided with a number of subcarriers used by reference signal within the symbol.

6. The wireless device of claim 1, wherein the transmission of the multi-antenna transmission scheme includes a symbol, the symbol includes two sequences as part of the multi-antenna transmission scheme.

7. The wireless device of claim 6, wherein the two sequences correspond to respective parts of an extended Zadoff-Chu sequence.

8. The wireless device of claim 6, wherein the two sequences include a first sequence and a second sequence, the first sequence having a first length, the second sequence having a second length being one half of the first length.

9. A method of a wireless device configured for transmission using a transmission scheme other than a multi-antenna transmission scheme, the method comprising:
receiving a transmission of the multi-antenna transmission scheme; and
performing at least one of a channel estimation function and a measurement function using the received transmission of the multi-antenna transmission scheme, the multi-antenna transmission scheme remaining transparent to the wireless device.

10. The method of claim 9, wherein the transmission of the multi-antenna transmission scheme includes a symbol, the symbol having cyclic delay diversity.

11. The method of claim 10, wherein the cyclic delay diversity is applied with a cyclic delay, and wherein the cyclic delay is dependent on reference signal bandwidth and channel delay spread.

12. The method of claim 10, wherein the cyclic delay diversity is applied with a cyclic delay, the cyclic delay causing a transparent reference signal to be exploited and a corresponding channel estimation to remain above a predetermined threshold, and allowing a frequency selectivity to be added.

13. The method of claim 10, wherein the cyclic delay diversity is applied with a cyclic delay, and wherein the cyclic delay is a Fast Fourier Transform (FFT) size divided with a number of subcarriers used by reference signal within the symbol.

14. The method of claim 9, wherein the transmission of the multi-antenna transmission scheme includes a symbol, the symbol includes two sequences as part of the multi-antenna transmission scheme.

15. The method of claim 14, wherein the two sequences correspond to respective parts of an extended Zadoff-Chu sequence.

16. The method of claim 9, wherein the received transmission of the multi-antenna transmission scheme includes a scheduling assignment and data;
the scheduling assignment having a first cyclic delay; and
the data having a second cyclic delay different from the first cyclic delay.

17. The method of claim 9, wherein the received transmission of the multi-antenna transmission scheme includes a scheduling assignment and data;
the scheduling assignment having a first cyclic delay diversity; and
the data having a second cyclic delay diversity different from the first cyclic delay diversity.

18. The method of claim 9, wherein the measurement function includes measuring a Physical Sidelink Shared Channel-Reference Signal Received Power, PSSCH-RSRP, based on the received transmission of the multi-antenna transmission scheme.

19. A network node, comprising;
processing circuitry configured to:
determine a transmission scheme for a wireless device, the wireless device configured for a multi-antenna transmission scheme;
transmitter circuitry configured to:
transmit the multi-antenna transmission scheme to the wireless device for transmission by the wireless device;
the transmission of the multi-antenna transmission scheme being usable by another wireless device that is configured for transmission using a transmission scheme other than the multi-antenna transmission scheme, the transmission of the multi-antenna transmission scheme causing the other wireless device to perform at least one of a channel estimation function and a measurement function using the transmission of the multi-antenna transmission scheme, the multi-antenna transmission scheme remaining transparent to the other wireless device.

20. A method for a network node, the method comprising;
determining a transmission scheme for a wireless device, the wireless device configured for a multi-antenna transmission scheme;
transmitting the multi-antenna transmission scheme to the wireless device for transmission by the wireless device;

the transmission of the multi-antenna transmission scheme being usable by another wireless device that is configured for transmission using a transmission scheme other than the multi-antenna transmission scheme, the transmission of the multi-antenna transmission scheme causing the other wireless device to perform at least one of a channel estimation function and a measurement function using the transmission of the multi-antenna transmission scheme, the multi-antenna transmission scheme remaining transparent to the other wireless device.

* * * * *